United States Patent [19]

Suzuki et al.

[11] Patent Number: 5,239,392
[45] Date of Patent: Aug. 24, 1993

[54] READING APPARATUS

[75] Inventors: Toshikazu Suzuki; Nobuo Kanai; Kazuyuki Yoshida; Masamitsu Ishiyama, all of Azuchi, Japan

[73] Assignee: Minolta Camera Kabushiki Kaisha, Osaka, Japan

[21] Appl. No.: 931,501

[22] Filed: Aug. 21, 1992

Related U.S. Application Data

[63] Continuation of Ser. No. 349,179, May 9, 1989, abandoned.

[30] Foreign Application Priority Data

| May 10, 1988 | [JP] | Japan | 63-113892 |
| Jul. 5, 1988 | [JP] | Japan | 63-167424 |
| Jul. 5, 1988 | [JP] | Japan | 63-167425 |
| Jul. 15, 1988 | [JP] | Japan | 63-177661 |
| Jul. 15, 1988 | [JP] | Japan | 63-177662 |
| Jul. 15, 1988 | [JP] | Japan | 63-177663 |
| Jul. 15, 1988 | [JP] | Japan | 63-177664 |
| Jul. 15, 1988 | [JP] | Japan | 63-177665 |

[51] Int. Cl.$^5$ .................. H04N 1/40; H04N 1/10
[52] U.S. Cl. .................. 358/474; 358/475; 358/486; 358/497; 358/487
[58] Field of Search .............. 358/474, 475, 480, 482, 358/483, 484, 487, 494, 497, 401, 408, 486; 355/75, 22, 23, 24, 223, 224

[56] References Cited

U.S. PATENT DOCUMENTS

| 4,656,525 | 4/1987 | Norris | 358/75 |
| 4,782,399 | 11/1988 | Sato | 358/443 |
| 4,816,903 | 3/1989 | Utsuda et al. | 358/487 |
| 4,893,196 | 1/1990 | Koshiyouji et al. | 358/474 |
| 4,989,099 | 1/1991 | Koshiyouji et al. | 358/474 |

FOREIGN PATENT DOCUMENTS

| 620743 | 7/1962 | Belgium . |
| 1013893 | 8/1957 | Fed. Rep. of Germany . |
| 59-198439 | 4/1983 | Japan . |

Primary Examiner—Edward L. Coles, Sr.
Assistant Examiner—Jerome Grant, II
Attorney, Agent, or Firm—Burns, Doane, Swecker & Mathis

[57] ABSTRACT

A reading apparatus of the invention has a high resolution reading part, a low resolution reading part, holding means for holding both the reading parts so as to be movable along a document, and means for selecting both the reading parts. The reading apparatus performs by one set of the apparatus total four modes of low resolution reading with respect to a light-impermeable document, high resolution reading with respect to the light-impermeable document, low resolution reading with respect to a large-sized light-permeable document, and high resolution reading with respect to a small-sized light-permeable document, such as a photographic film.

24 Claims, 22 Drawing Sheets

READING APPARATUS

This application is a continuation of application Ser. No. 07/349,179, filed May 9, 1989 abandoned.

BACKGROUND OF THE INVENTION

1. Field of the Invention

The present invention relates to a reading apparatus for reading a document at an image forming apparatus, such as a copier or the like, and more particularly to a reading apparatus readable of a photographic film.

2. Description of Related Art

Recently, a digital copier, which can read the document by an image reading apparatus and store and process an image information as an electric signal, has been popularized. Such a digital copier can easily execute positive polarization from an ordinary photographic film, in other words, a negative film, thereby obtaining a large-sized copy of a film.

In a case where the large-sized copy is thus obtained from the photographic film or the like, it is considered that, for example, a document cover provided with a reflecting plate is used to read a film image as the same as the ordinary document to thereby enlarge it by signal processing or read it by use of a magnification optical system. The film image, however, is small, thereby creating the problem in that the magnification will lower the revolving power.

Also, it is difficult to accurately position the film, and an accurate image may not be obtained. Moreover, the film as a reading object includes a slide film mounted to a slide mount and a negative film piece cut in unit of several frames, so that, when they are placed on a document table, the slide film and the film piece are different in height from each other due to thickness of the slide mount, thereby creating the problem in that resolution of either one lowers.

Accordingly, the method has been proposed which magnifies the film image on the document table by use of a projector to thereby read the magnified image (disclosed in the Japanese Patent Application Laid-Open No. 59-198439). This method, however, requires a wide space for an optical path for magnifying and projecting the film image on the document table, thereby having a defect that the apparatus becomes large-sized.

SUMMARY OF THE INVENTION

In order to solve the above problems, the present invention has been designed. A reading apparatus of the invention has first and second reading parts different in reading resolution from each other and holding member holding both the reading parts and slidable along the document surface. The single reading apparatus of the invention can select the two reading parts to perform four modes of low resolution reading a light-impermeable document, high resolution reading the same, low resolution reading a large-sized light-permeable document, and high resolution reading a small-sized light-permeable document, such as a photographic film.

A first object of the invention is to provide a reading apparatus performable of reading in high resolving power with respect to the photographic film.

A second object of the invention is to provide a reading apparatus expected to be miniaturized.

A third object of the invention is to provide a reading apparatus which holds a film in such a manner that a distance between the film mounted to a slide mount and the high resolution reading part is equalized to that between the film piece and the high resolution reading part, thereby enabling both the slide film mounted on the slide mount and film piece to be read with accuracy.

A fourth object of the invention is to provide a reading apparatus which the longitudinal direction of a holder for holding the film, in other words, the film juxtaposing direction, is coincident with the main scanning direction or the sub-scanning direction of a document table, so that a driving system for moving the high resolution reading part is usable in common with an existent low resolution reading part to thereby restrict an increase in number of parts.

A fifth object of the invention is to provide a reading apparatus in which a light source for irradiating the light on the light-permeable document is provided detachably with respect to the main body, thereby not hindering reading operation with respect to the ordinary light-impermeable document.

A sixth object of the invention is to provide a reading apparatus which is obtainable of uniform luminous intensity at the entire images due to the light incident on the photographic film in condition of being parallel to a document table, thereby preventing the high resolution reading part from causing a short quantity of light.

A seventh object of the invention is to provide a reading apparatus which switches to at least two directions the irradiation direction of the light from the light source onto the light-impermeable document, thereby enabling the low resolution reading and high resolution reading by one light source with respect to the light-impermeable document.

An eighth object of the invention is to provide a reading apparatus which drives charge-coupled devices at the two reading parts different in reading resolution by use of one driving circuit in common, thereby enabling a wastefully high manufacturing cost to be restricted.

A ninth object of the invention is to provide a reading apparatus which is provided with a high resolution reading part movable in the main scanning direction of the document, thereby enabling the film image to be read at a desired position.

The above and further objects and features of the invention will more fully be apparent from the following detailed description with accompanying drawings.

DESCRIPTION OF THE PREFERRED EMBODIMENTS

A reading apparatus of the present invention (to be hereinafter called the apparatus of the invention) is provided with four reading modes corresponding to the kind of document and the reading resolution. Mode 1 is to irradiate the light on the ordinary light-impermeable document and to read an image thereof by the reflected light. Mode 2 reads the light-impermeable document as the same as the mode 1, but reads the document in higher resolution than mode 1, thereby preventing the resolution of image from lowering even when the image is magnified. Mode 3 reads a relatively large-sized light-permeable document, such as a transparent sheet or the like for an overhead projector and is equivalent in reading resolution to that of mode 1. Mode 4 reads a small-sized light-permeable document, such as a photographic film or the like and is equivalent to the mode 2 in reading resolution.

Figure 1:
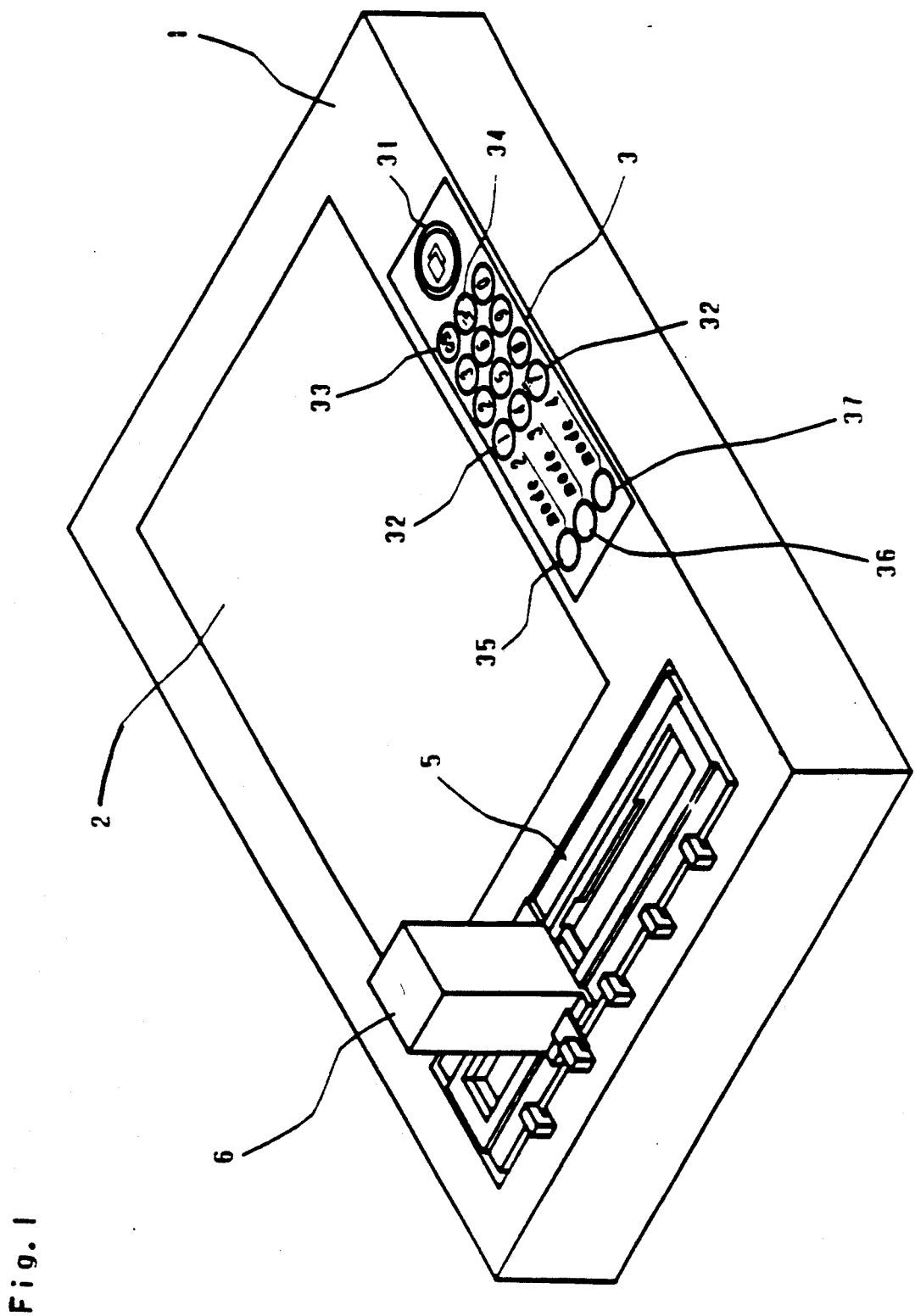
FIGS. 1 and 2 are perspective exterior views of an embodiment of a reading apparatus of the invention.
Figure 2:
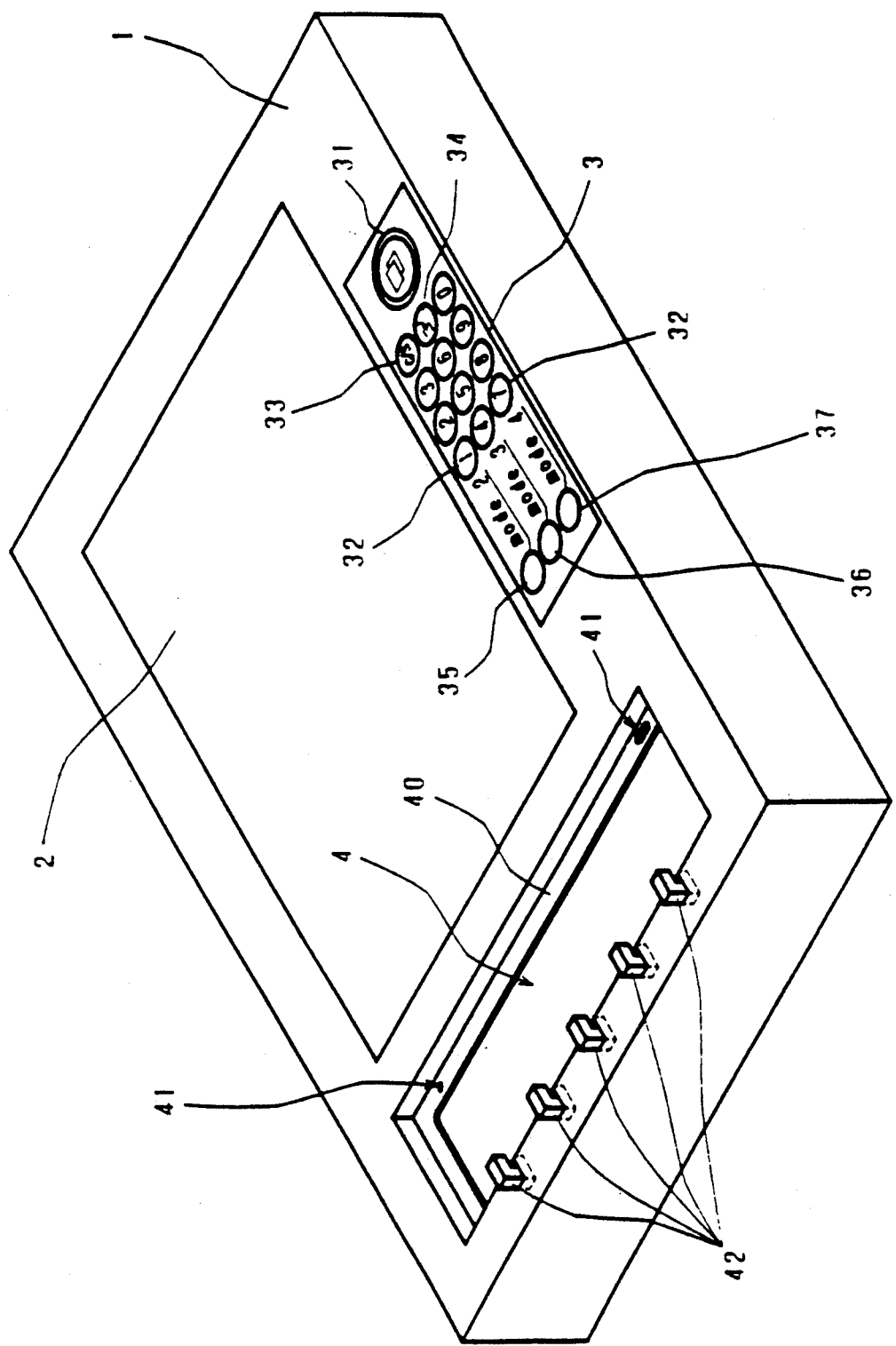

FIGS. 1 and 2 are perspective exterior views of the apparatus of the invention, the main body 1 being provided at the upper surface with a document table 2 formed of a glass plate. A operation panel 3 is disposed in the front of document table 2 and an opening 4 (refer to FIG. 2) used for reading a photographic film at mode 4 is disposed at the left side of the same. On the operation panel 3 are disposed a print key 31, numeric keys 32, a clear/stop (C/S) key 33, an interrupt key 34, and mode selector keys 35, 36 and 37 for selecting the aforesaid four kinds of modes. The mode 1 is the standard mode, any one of the mode selector keys 35 (mode 2), 36 (mode 3) and 37 (mode 4) is depressed to enable the mode 2, 3 or 4 to be switched to a desired mode. In addition, when the mode 1 is intended to be switched (when the standard mode is intended to be reset), the clear/stop (C/S) key 33 is depressed, thereby enabling the mode 1 to be selected.

The rectangular opening 4 is provided in relation of being coincident in the longitudinal direction with the depth direction of the document table 2, that is, the depth direction of a main body 1. A washer 40 shown in FIG. 2 for mounting a film holder 5 and a light box 6 is provided at the peripheral portion of the opening 4 and at the lower position than the upper surface of document table 2. Bores 41 are formed in the vicinity of both corners of the opening 4 at the document table 2 side. At the left-hand side edge of opening 4 are juxtaposed at regular intervals a plurality of sensing units 42 which have a light emitting element and a photo-detecting element for detecting the position of the light box 6 to be discussed below. When the film holder 5 and light box 6 are not mounted at the opening 4, in other words, when the mode 4 is not performed, the opening 4 is closed by a lid (not shown) so as not to hinder operation in other reading modes.

Figure 3:
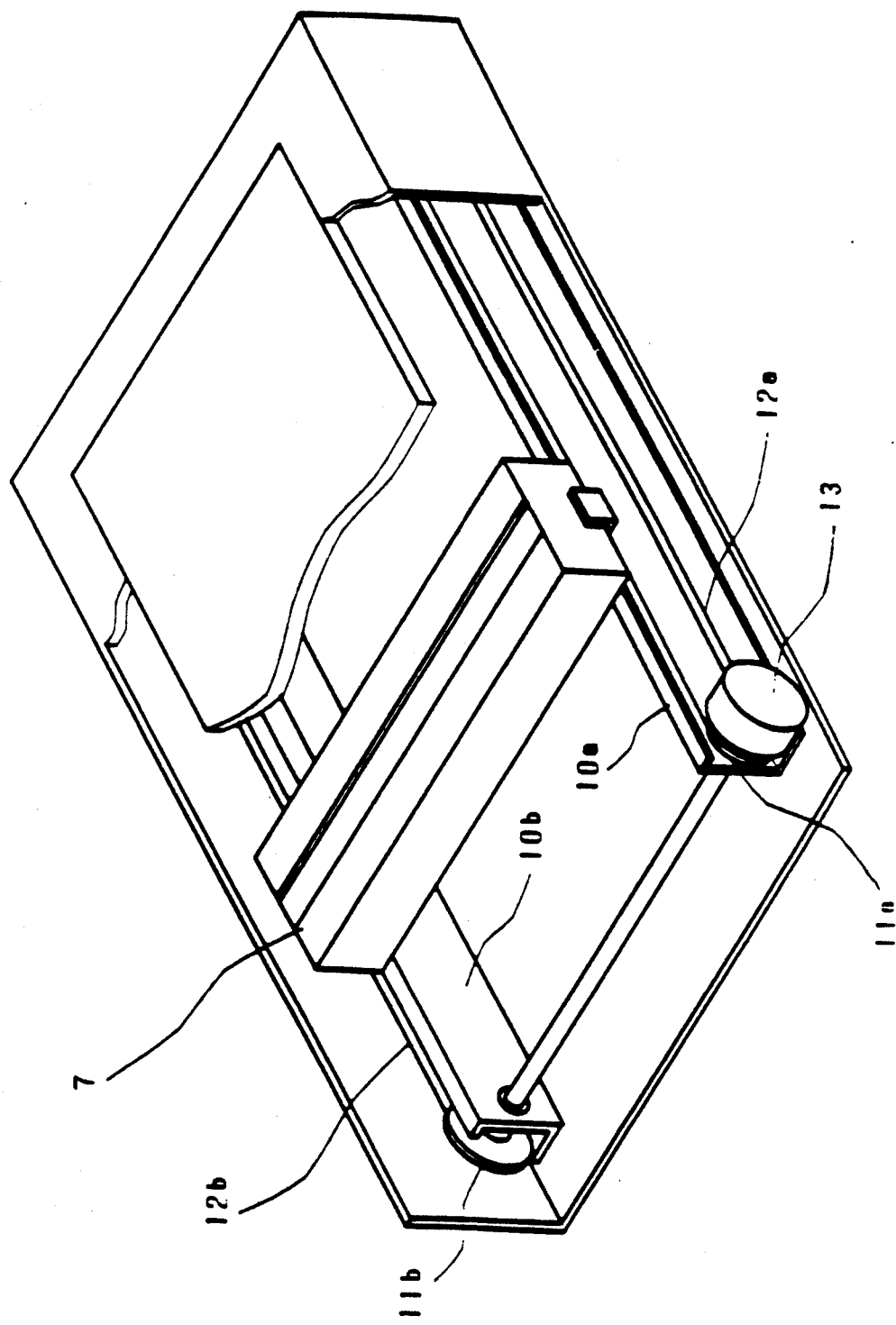
FIG. 3 is a perspective view of internal construction thereof.

FIG. 3 is a perspective view showing an internal construction of the main body 1. At the inner bottom of the main body 1 are disposed a pair of opposite rails 10a and 10b each of length slightly smaller than a width of the main body 1 and the longitudinal direction of a pair of them is coincident with the width direction of the main body 1. A reading head 7 rectangular and slightly smaller in depth than the main body 1 is disposed across the rails 10a and 10b and perpendicularly thereto. The reading head 7 moves on the rails 10a and 10b widthwise, that is, laterally, of the main body 1 by means of pulleys 11a and 11b disposed on the rails 10a and 10b to be driven by a motor 13 and wires 12a and 12b stretched on the pulleys 11a and 11b respectively.

Figure 4:
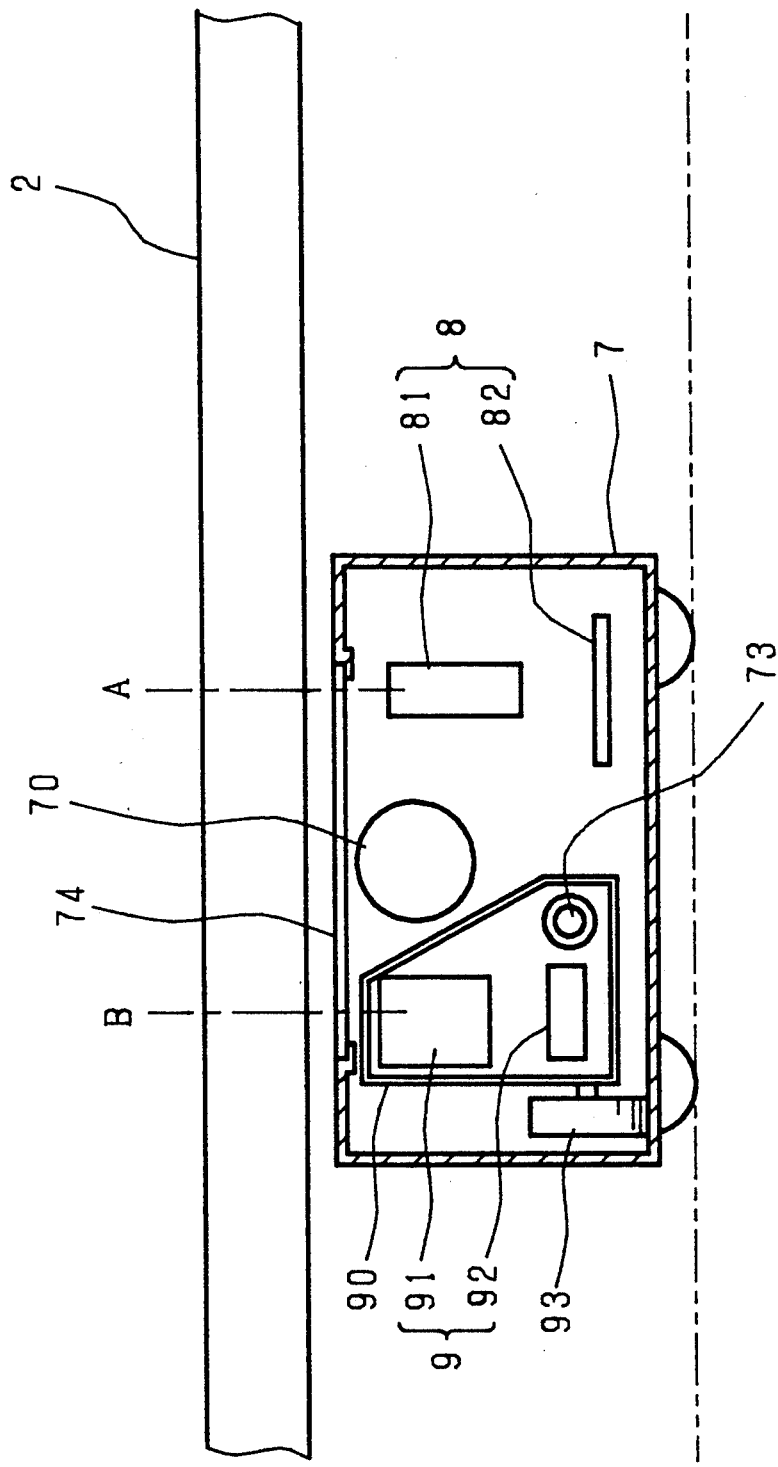
FIG. 4 is a longitudinally sectional view of a reading head of the same.
Figure 5:
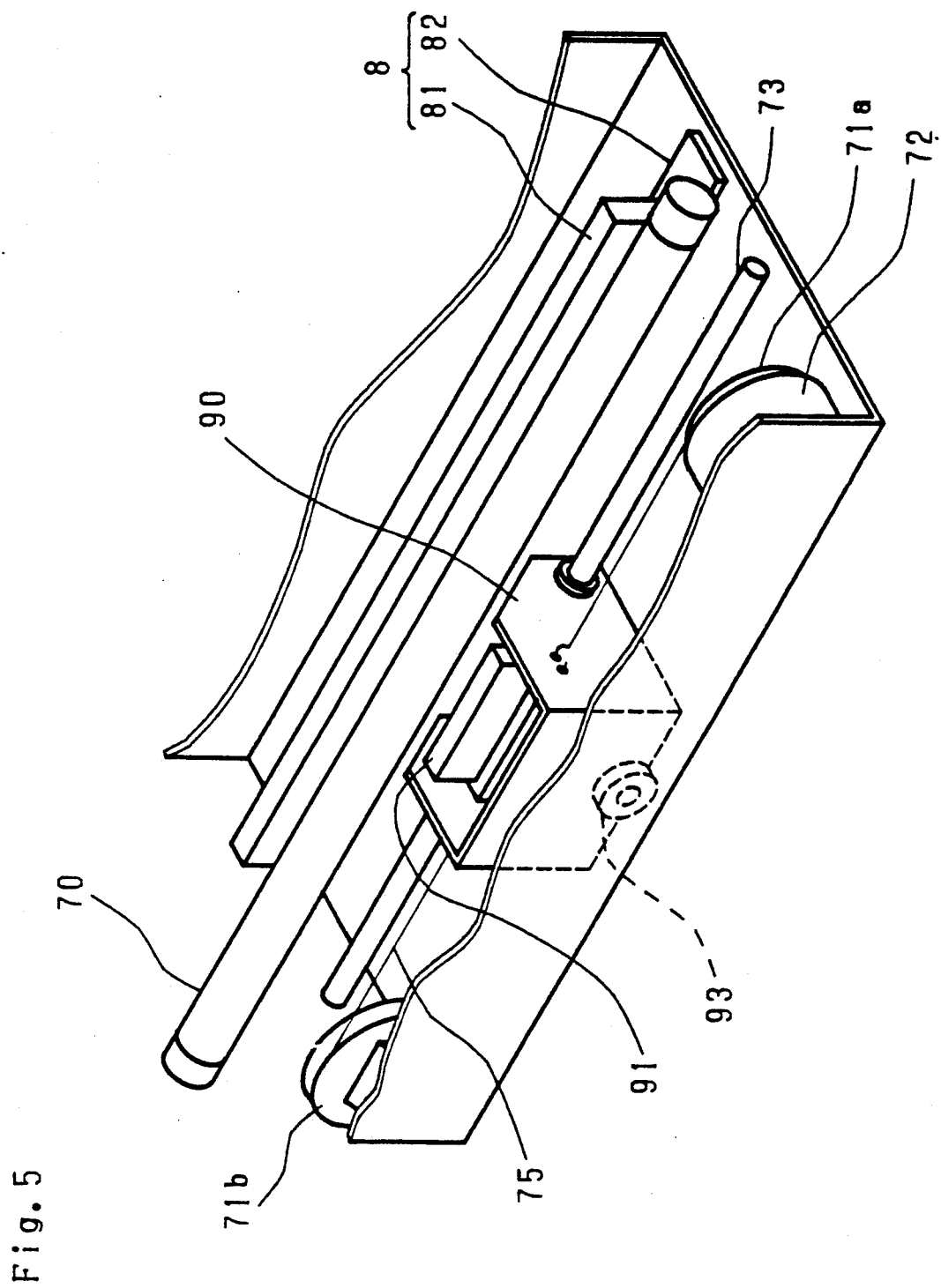
FIG. 5 is a perspective view of internal construction of the reading head of the same.
Figure 6:
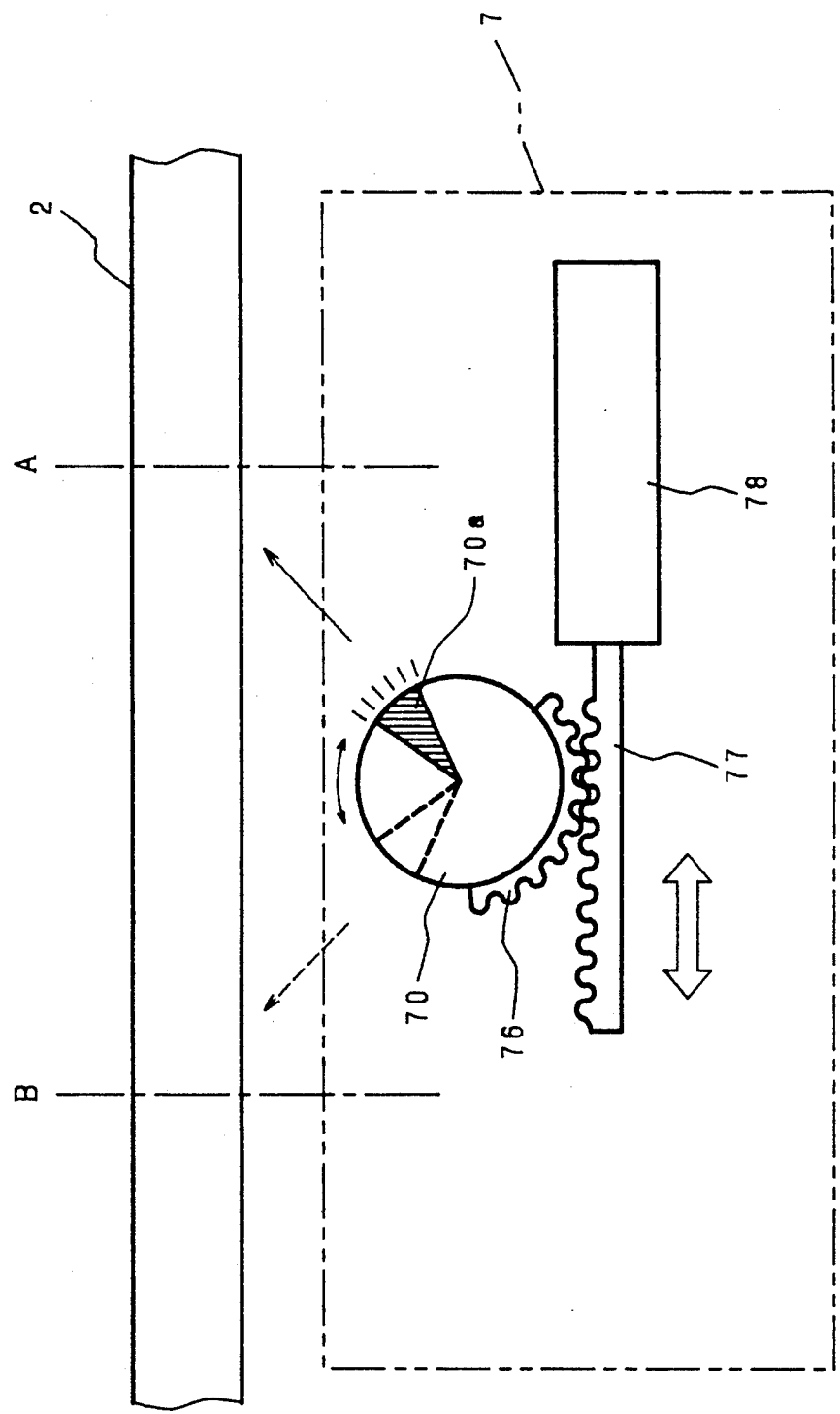
FIG. 6 is a longitudinally sectional view of a driving mechanism for switching the irradiation direction of the light from a light source of the same.

FIG. 4 is a longitudinally sectional view of the reading head 7 cut perpendicularly to the depth direction thereof when viewed from the front. FIG. 5 is a perspective view of internal construction of the reading head 7. The reading head 7 forms at the center of the upper surface an opening extending throughout the entire depthwise length, the opening being closed by a glass plate 74. A low resolution reading part 8 used in the modes 1 and 3 and a high resolution reading part 9 used in the modes 2 and 4 are provided inside the reading head 7. At the glass plate 74 side is a light source 70 of, for example, aperture type axially extending along the depth direction of reading head 7, the light source 70 having a length about equal to that in the depth direction of document table 2 and being mounted opposite to the lower surface of the document table 2 through the glass plate 74 so as to be circumferentially rotatable by a driving mechanism as shown in FIG. 6. The low resolution reading part 8 is disposed at the right side of the light source 70, comprises a lens 81 and a charge-coupled device (CCD) 82 which are about equal in length to the light source 70, and is constructed to be coincident lengthwise with the depth direction of the document table 2 so as to perform main scanning with respect to the document.

At the left side of the light source 70 is disposed a high resolution reading part 9 having a reading width in the main scanning direction of 1/5 through 1/10 of reading width in the main scanning direction of the low resolution reading unit 8. For example, the reading width of low resolution reading part 8 is 300 mm and that of high resolution reading part 9 60 mm, both the reading parts being readable of 5000 picture elements in the reading widths. In addition, the main scanning direction of the high resolution reading part 9 is parallel to that (the main scanning direction of document table 2) of the low resolution reading part 8. The high resolution reading part 9 comprises a lens 91 of, for example, a focusing rod lens, and a charge-coupled device 92. Generally, the charge-coupled device element for high resolution reading is low in sensitivity than that for lower resolution reading, whereby, in order to obtain a sufficient S/N ratio during the high resolution reading, the focusing rod lens is used as the high resolution reading lens. The high resolution reading part 9 is equipped in a high resolution reading unit 90 of a rectangular parallelepiped, and through one end thereof perforates a shaft 73 disposed throughout the entire depthwise length of the reading head 7 and parallel to the axial direction of light source 70. The high resolution reading unit 90 is provided at the reverse side to the shaft 73 insertion portion with a roller 93 in the relation that its rotary shaft is perpendicular to axial direction of the shaft 73. The high resolution reading unit 90 moves axially of the shaft 73, that is, depthwise of the reading head 7 through pulleys 71a and 71b driven by a stepping motor 72 provided in the reading head 7 and a wire 75 stretched between the pulleys 71a and 71b.

FIG. 6 is a longitudinally sectional view exemplary of the driving mechanism for circumferentially rotating the light source 70. A rack actuator 78 of solenoid system engages teeth at a rack 77 projecting or retracking in the direction of the void arrows with teeth 76 formed at part of the peripheral surface of the light source 70. The aperture 70a of the light source 70 is adapted to orient toward the position A when the rack 77 projects and toward the position B when it retracts, the light source 70 being switchable in the direction of A or B.

Figure 7:
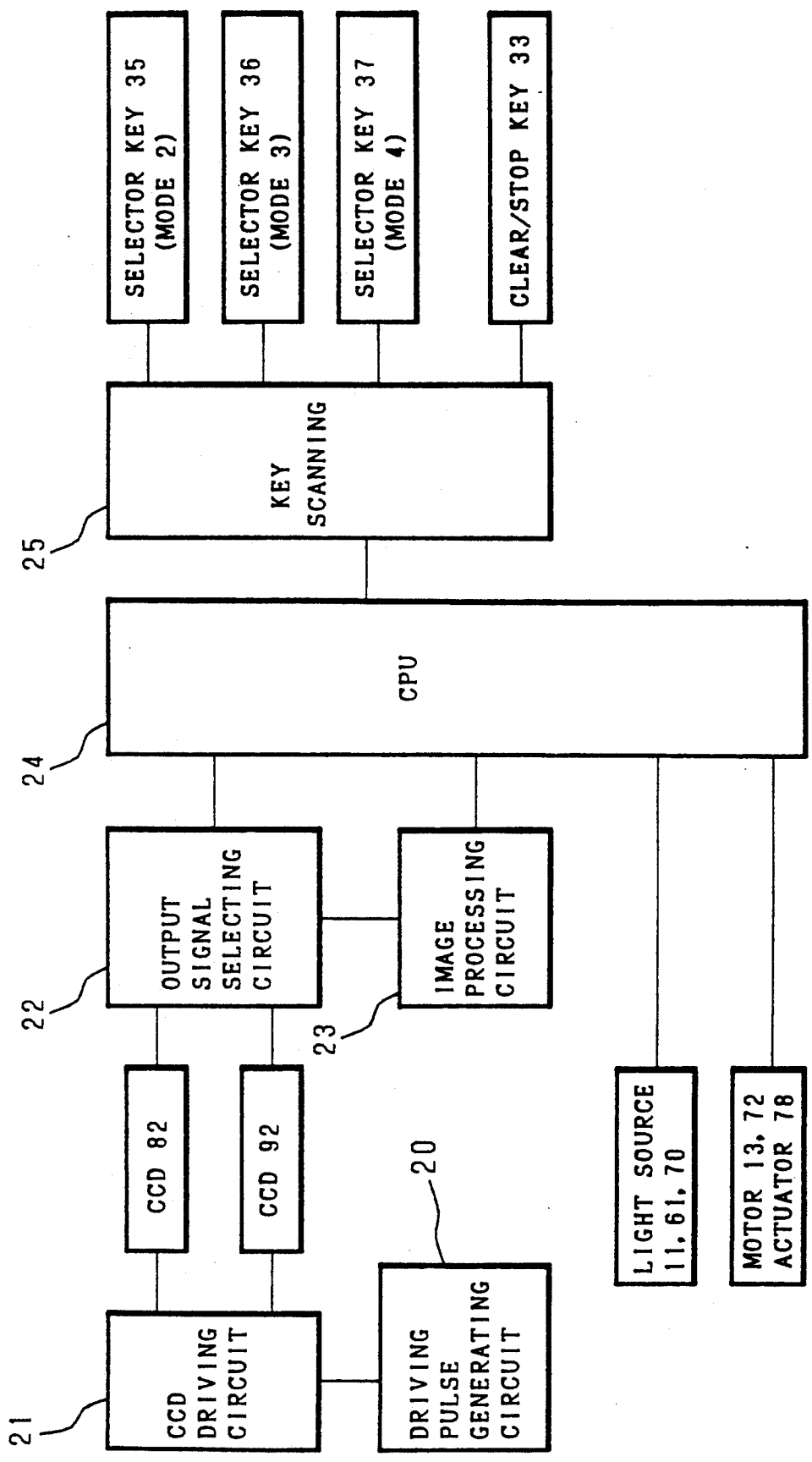
FIG. 7 is a block diagram of a driving circuit of the same.

FIG. 7 is a block diagram of a driving system of the apparatus of the invention. A key scanning 25 detects an input to the mode selector keys 35, 36 and 37 and clear/stop key 33. When any key is on and in the interrupt condition, the selected mode is switched. Upon turning on the CCD driving circuit 21, pulses from a driving pulse generating circuit 20 are inputted to both the CCD 82 for low resolution reading and the CCD 92 for high resolution reading. A central processing unit (CPU) 24 controls an output signal selecting circuit 22 so as to input an output signal only of either the CCD 82 or 92 to an image processing circuit 23 corresponding to the selected mode, the CCDs 82 and 92 using the CCD driving circuit 21 and the image processing circuit 23 in common by equalizing the numbers of picture elements as well as a storage time of a photo signal. In addition, the CPU 24 controls on-off of the light source for irradiating the light to the document, driving for the rack actuator 78, and driving for the motor to move the reading parts.

Figure 8:
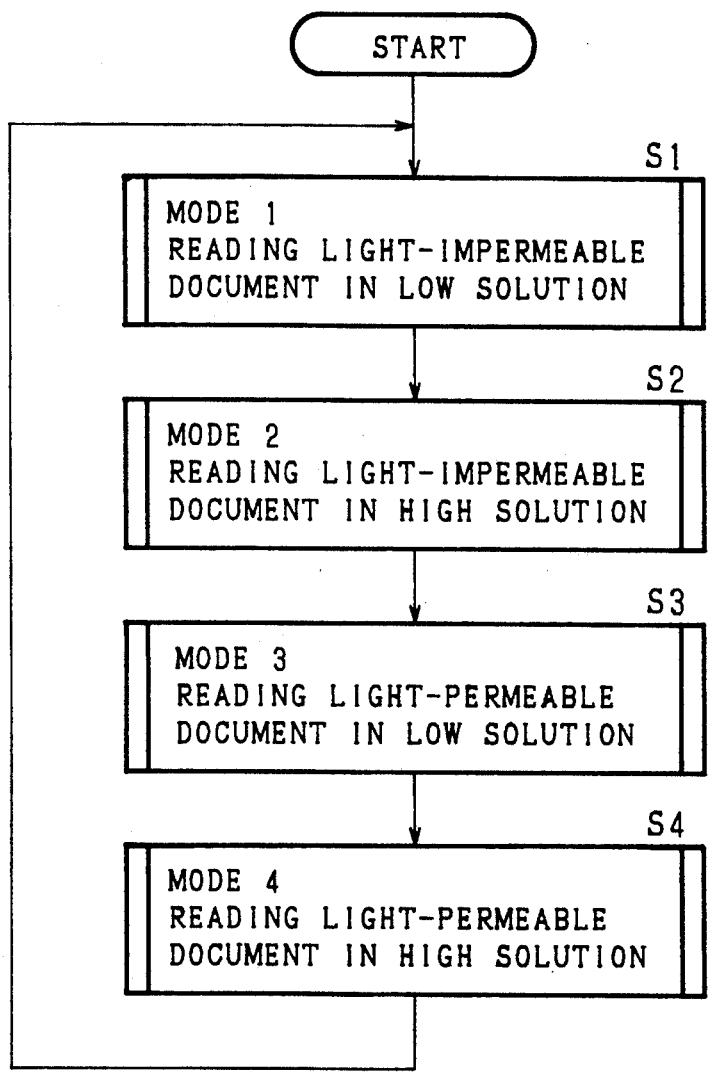
FIGS. 8 through 11 and 21 are flow charts explanatory of the operation of the same.

Next, explanation will be given on operation of reading. FIG. 8 is a flow chart showing reading operation of the invention. The apparatus of the invention can carry out four kinds of reading modes: usual reading of light-impermeable document (mode 1, step S1), high resolution reading of light-impermeable document (mode 2, step S2), usual reading of light-permeable document (mode 3, step S3), and high resolution reading of light-permeable document, such as a photographic film (mode 4, step S4).

Figure 9:
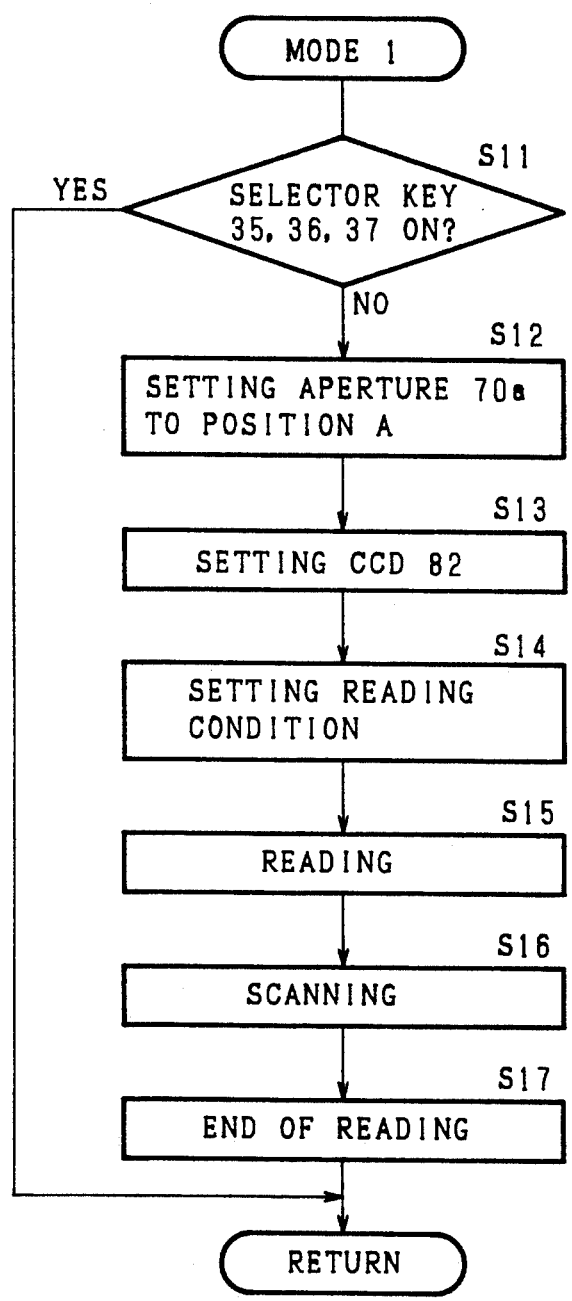

At first, explanation will be given on the reading in mode 1 on the basis of subroutine in a step S1 shown in FIG. 9. When any selector key 35, 36 or 37 is not on (in step S11: NO), the mode 1 is selected. Namely, at first the aperture 70a of the light source 70 is set to project the light to the position A (step S12), and the output signal selecting circuit 22 is controlled to input the output signal of CCD 82 to the image processing circuit 23 (step S13). After the reading condition is set (step S14), the light from the light source 70 is irradiated to the lower surface of the light-impermeable document placed on the document table 2 so that the diffuse reflected light is image-formed on the CCD 82 by the lens 81 at the low resolution reading part 8 (step S15). The reading head 7 scans to perform the main scanning to obtain the image information of one line and the motor 13 is further driven to move the reading head 7 widthwise of the main body 1, thereby performing the subscanning of document image (step S16), and the reading of the entire document is completed (step S17), wherein the reading resolution of image by the low resolution reading part 8 is 10 through 20 picture elements/mm.

Figure 10:
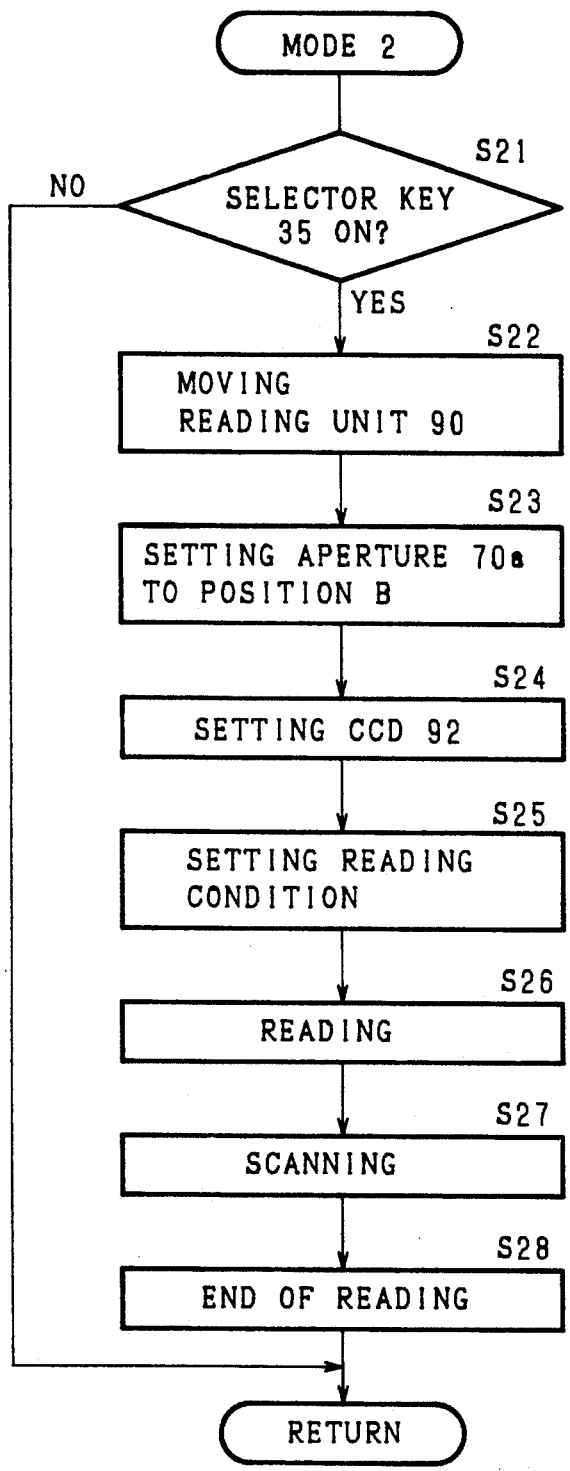

Next, explanation will be given on the reading in mode 2 in accordance with FIG. 10 showing a subroutine in step S2. When the selector key 35 is on (step S21: YES), the mode 2 is selected. At first, the high resolution reading unit 90 moves to a desired reading position of the light-impermeable document on the document table 2 in the main scanning direction by driving the stepping motor 72 (step S22). Next, the aperture 70a is set to project the light to the position B (step S23). The output signal selecting circuit 22 is controlled to input the output signal of CCD 92 to the image processing circuit 23 (step S24). After the reading condition is set (step S25), similarly, the light from the light source 70 is irradiated to image-form the position B on CCD 92 by the reading lens 91 to thereby perform the main scanning and the motor 13 is driven to perform the subscanning to read the document in high resolution (steps S26, 27, 28), at which time the reading resolution of image in high resolution reading is 50 through 200 picture elements/mm, so that, when compared with the low resolution reading, the resolution does not lower even for the enlarged image.

Figure 11:
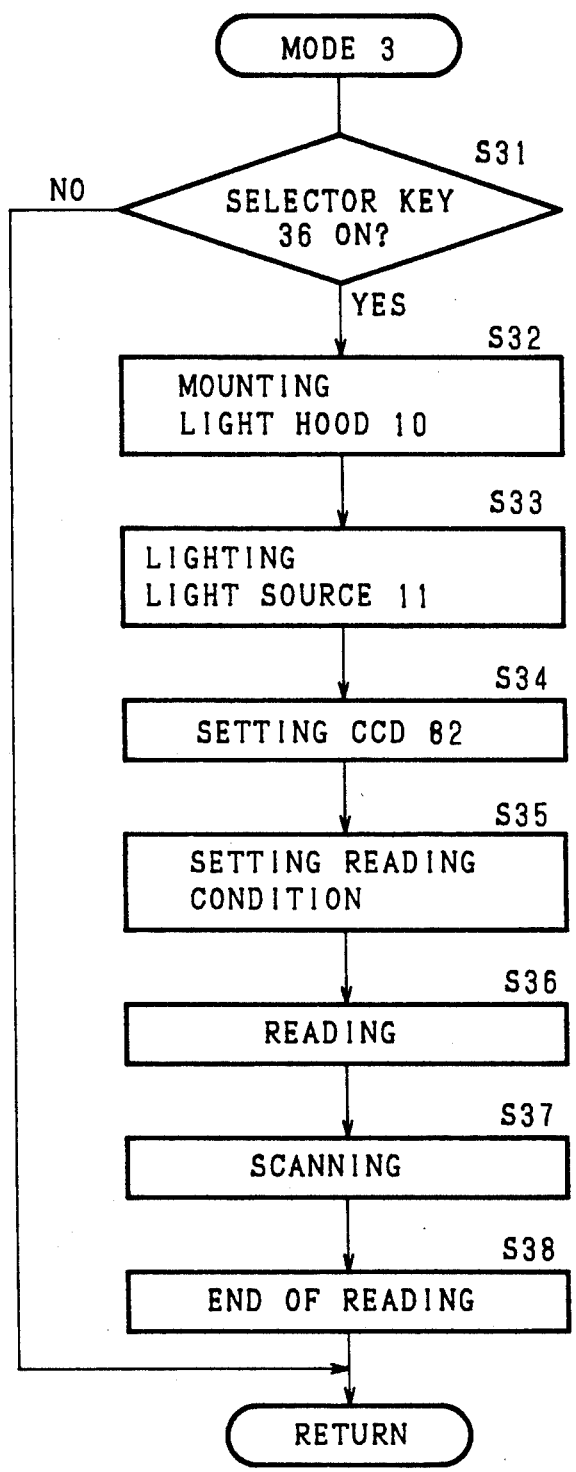
Figure 12:
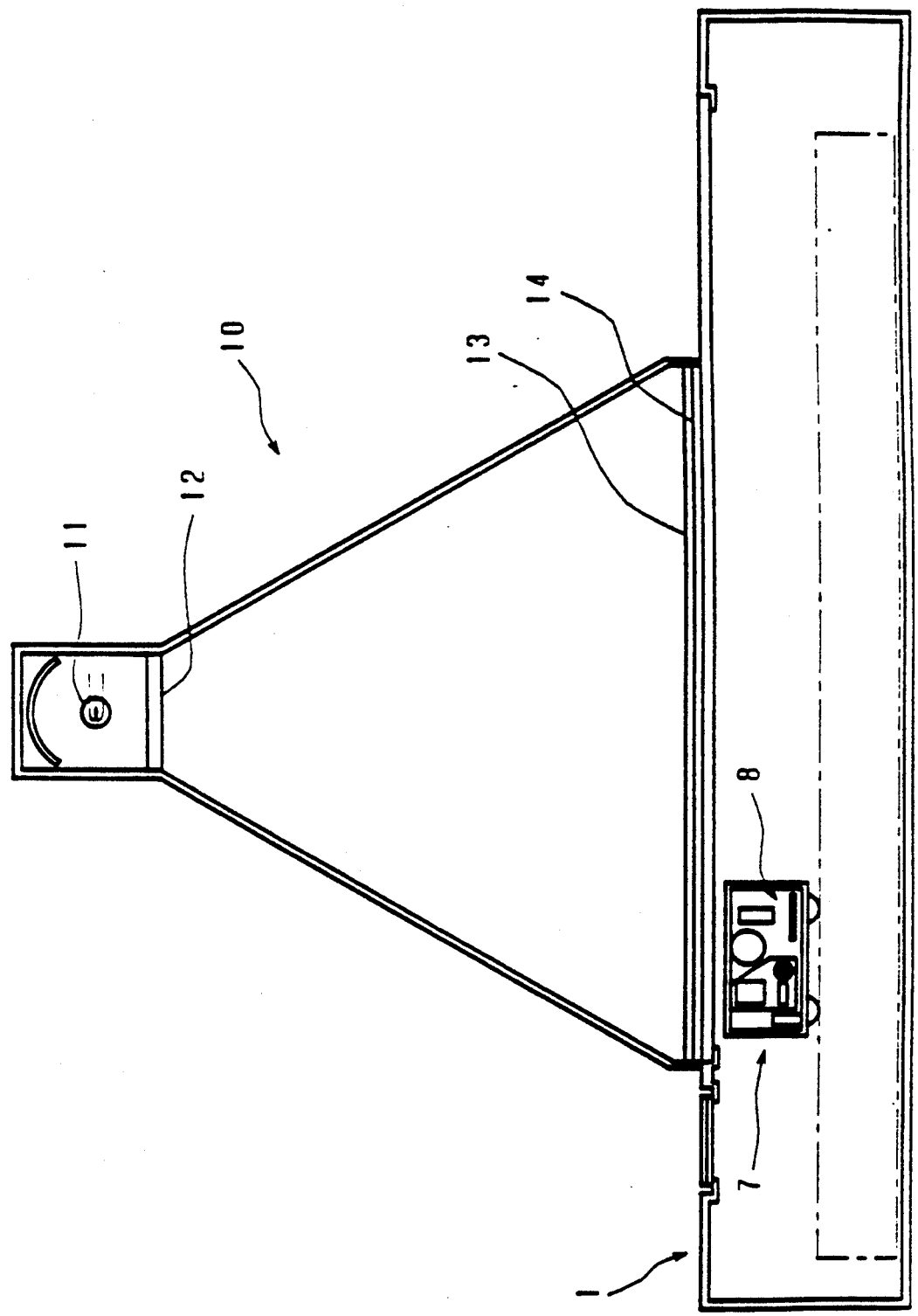
FIG. 12 is a longitudinally sectional view of mounting condition of a light hood at the same.

Next, explanation will be given on the reading in the mode 3 in accordance with FIG. 11 showing the subroutine in step S3. When the selector key 36 is on (step S31: YES), the mode 3 is selected. At first, a light hood 10 shown in FIG. 12 is mounted on the document table 2 at the main body 1 (step S32), the light hood 10 being of a square pyramid shape and having at the crest a light source 11 so as to diffuse and irradiate the light thereof toward the bottom through a heat insulating filter 12 disposed below. At the bottom are disposed a Fresnel lens 13 and a transparent diffuse plate 14 in layers, the transparent diffuse plate 14 being opposite at the lower surface to the light-permeable document (not shown) put on the document table 2, and provided in order to modify unevenness of illumination, such as an annular shadow of Fresnel lens 13. Next, after the light source 11 is lit (step S33), the same operation as the procedure in mode 1 is used to read the light-permeable document by the low resolution reading part 8 (steps S34, 35, 36, 37 and 38).

As the above-mentioned, in all the modes 1 through 3, the document is placed on the document table 2 and the document images are scanned.

Figure 13:
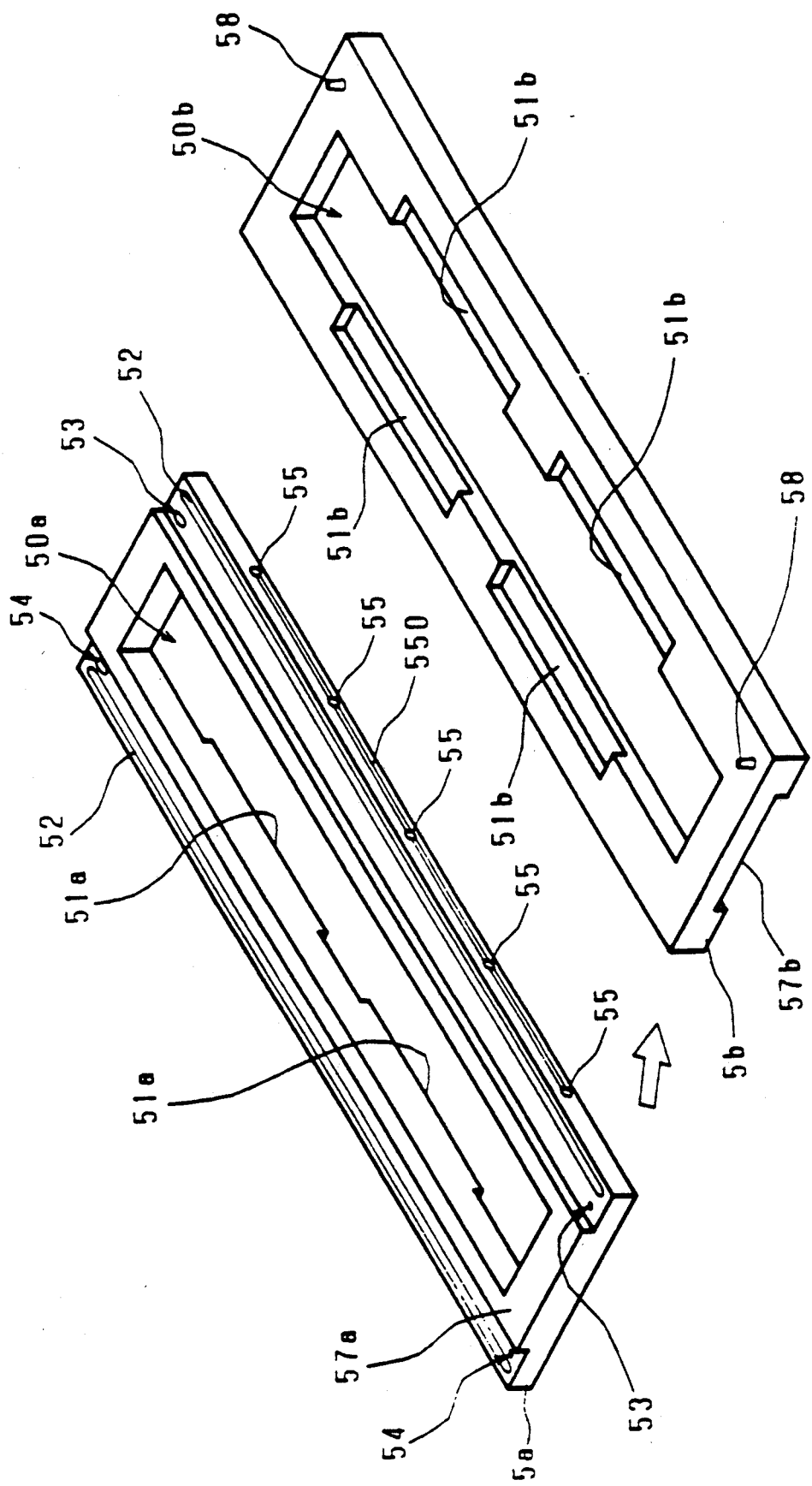
FIGS. 13 and 14 are perspective exterior views of a film holder at the same.
Figure 14:
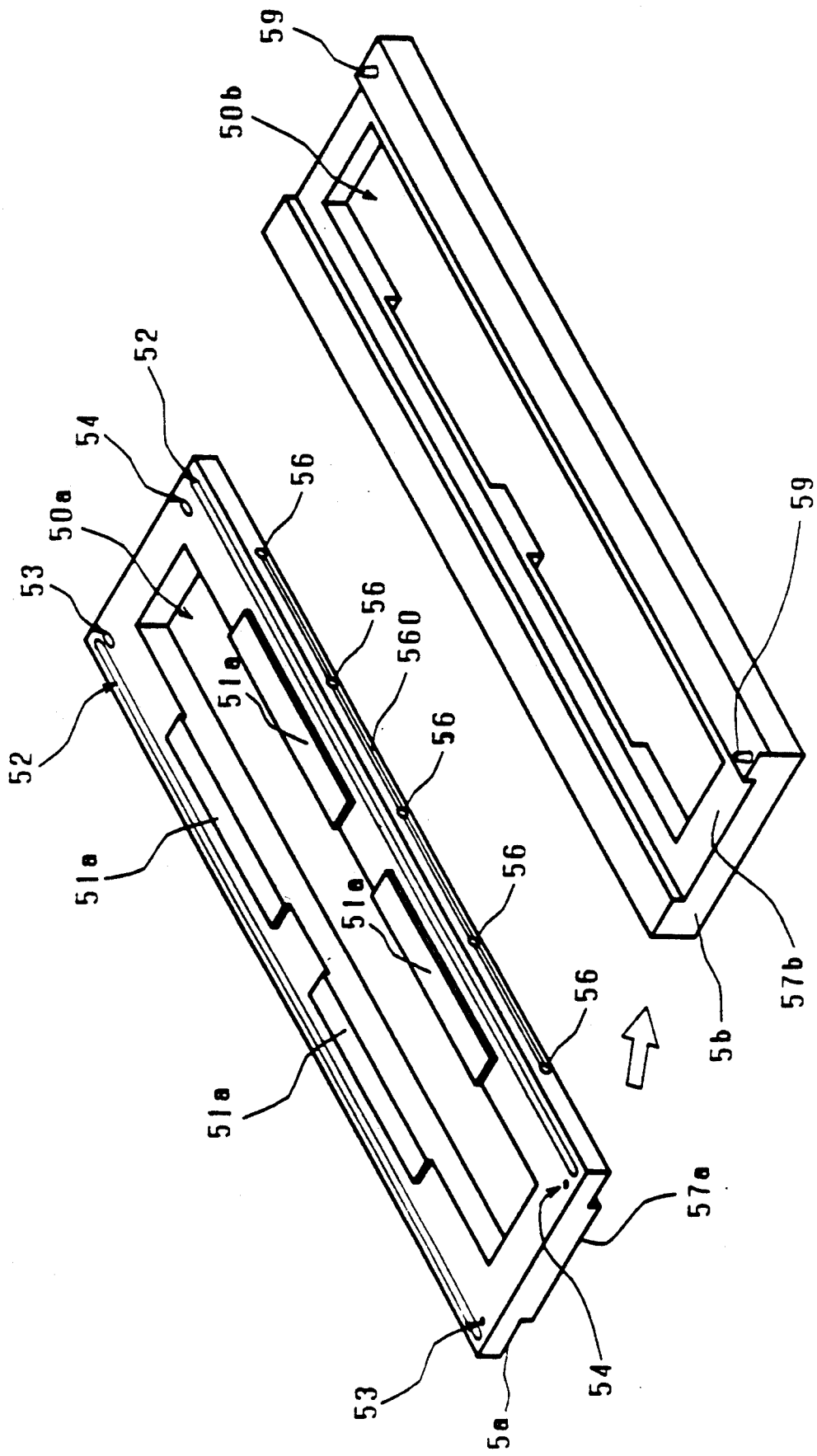

Next, explanation will be given on reading of photographic film in mode 4. FIGS. 13 and 14 are perspective externally structural views of a film holder 5 used for reading in mode 4. The elongate film holder 5 fitted in the opening 4 at the main body 1 integrally couples a pressure plate 5a and a base plate 5b having at the centers rectangular openings 50a and 50b each of minor side of a length about equal to a width of image at the film. Such coupling is changed to enable the slide film or the usual negative film to be held.

Referring to FIG. 13, a slide mount in which the slide film is housed is held, in which four recesses 51b for insertably placing therein the slide mount are formed by every two at both lengthwise side edges of opening 50b at the base plate 5b. When the slide mount is fitted in the recesses 51b, each recess 51b is determined to be deep in the relation that the upper surface of the slide mount is lower than that of the base plate 5b. Two pins 58 are provided at the upper surface of the base plate 5b near both corners at the front side thereof and two pins 59 (refer to FIG. 14) are provided at the lower surface of the base plate 5b near both corners at the rear side thereof. Four projections 51a to be fitted to the recesses 51b are provided at four portions (refer to FIG. 14) at both lengthwise side edges of the opening 50a at the lower surface of the pressure plate 5a respectively. The height of each projection 51a from the lower surface of the pressure plate 5a is decided to be about equal to a length between the upper surface of the base plate 5b and the upper surface of the slide mount when fitted in the recesses 51b. Between the projections 51a and both lengthwise side edges of the pressure plate 5a are provided two elongate guide slots 52 slightly smaller in length than the pressure plate 5a, extending lengthwise thereof, and perforating depthwise of the same. At the front side surface of the pressure plate 5a is formed a groove 550 extending lengthwise of the pressure plate 5a. A plurality of recesses 55 each having a bore diameter larger than a width of the groove 550 are provided at the groove 550 and spaced at regular intervals. Two bores 53 into which the pins 58 at the base plate 5b are inserted are formed near both the front side corners respectively.

In a case where the film holder 5 holds the slide mount (not shown), at first the slide mount is fitted into the recesses 51b at the base plate 5b, the projections 51a are fitted into the recesses 51b respectively, and the pins 58 are inserted into the bores 53 respectively so as to couple the pressure plate 5a with the base plate 5b. Therefore, the slide mount is sandwiched at the side edges thereof, the openings 50a and 50b are positioned perpendicularly to the image plane of the slide film, and the image is rendered to face at both the planes to the exterior.

FIG. 14 shows the case of holding each film piece cut to the predetermined number of frames (usually five frames) from one negative film in order to be housed in a storage casing, in which the pressure plate 5a and base plate 5b each use the reverse surface to the surface shown in FIG. 13. At the widthwise central portion of the upper surface (the lower surface in FIG. 13) of the base plate 5b is formed a recess 57b having a bottom larger in width than the opening 50b and approximately equal in width to the film and extending entirely lengthwise of the base plate 5b. The aforesaid pins 59 are provided at the upper surface (the lower surface in FIG. 13) of the base plate 5b near both the front side corners thereof, the projection 57a to be fitted to the recess 57b is provided at the lower surface (the upper surface in FIG. 13) of the pressure plate 5a and extends throughout lengthwise thereof, at the front side surface, that is, the reverse side surface to the side surface on which the groove 550 and recesses 55 are formed, are formed a similar groove 560 and a plurality of recesses 56, and near both the front side corners at the reverse side to the corners at which the bores 53 are formed two bores 54 into which the pins 59 are to be fitted.

The film piece, when held by the film holder 5, is fitted in the recess 57b at the base 5b, and the projection 57a is fitted to the recess 57b, so that the pins 59 are inserted into the bores 54 respectively to thereby couple the pressure plate 5a with the base plate 5b. As the result, take-up bore portions are both lengthwise ends at the film piece are put between the pressure plate 5a and the base plate 5b and the opening 50a and 50b are positioned perpendicularly to the image plane of the film, thereby allowing both the image planes to face to the exterior respectively.

Figure 15:
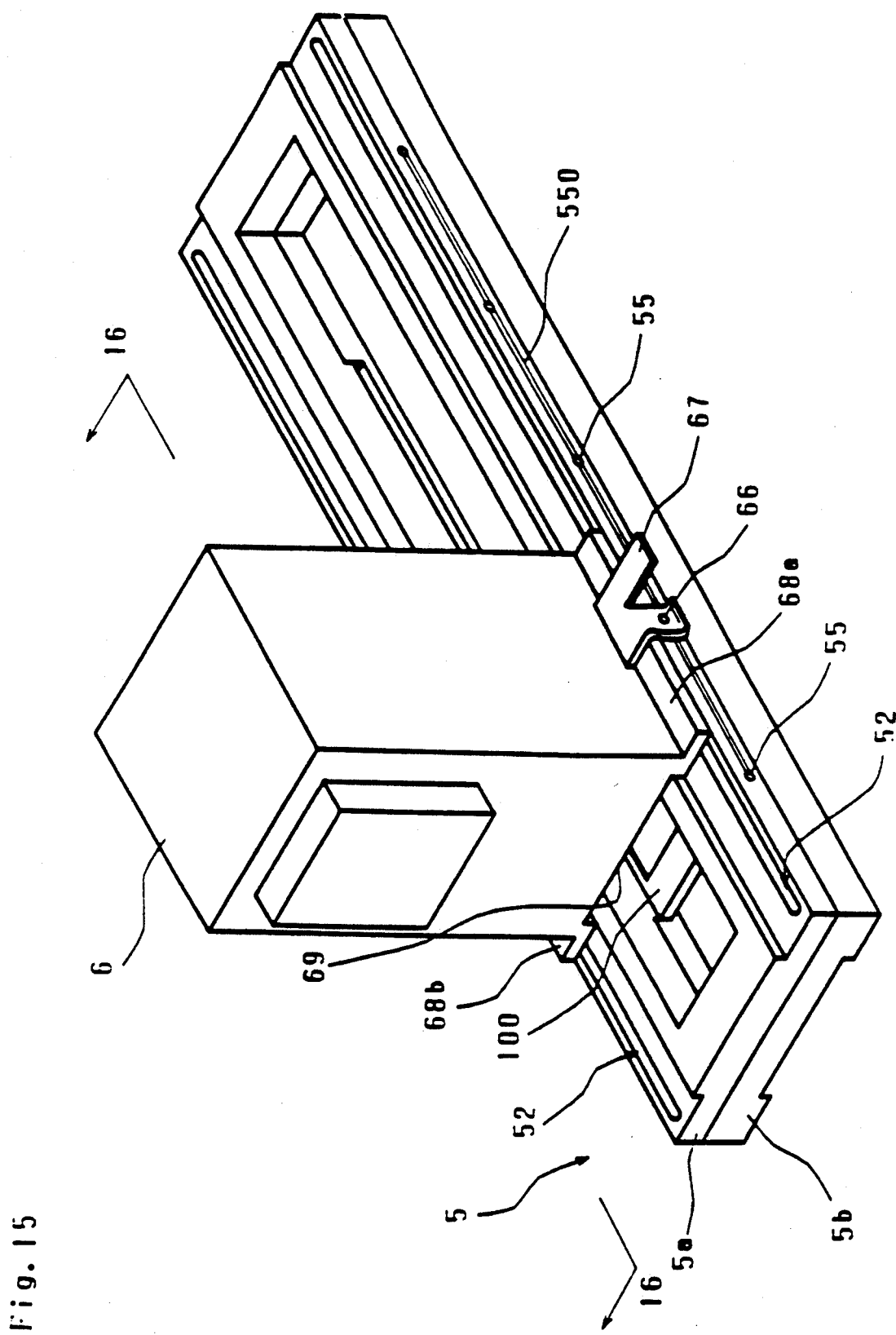
FIG. 15 is a perspective exterior view showing a light box mounted on the film holder at the same.
Figure 16:
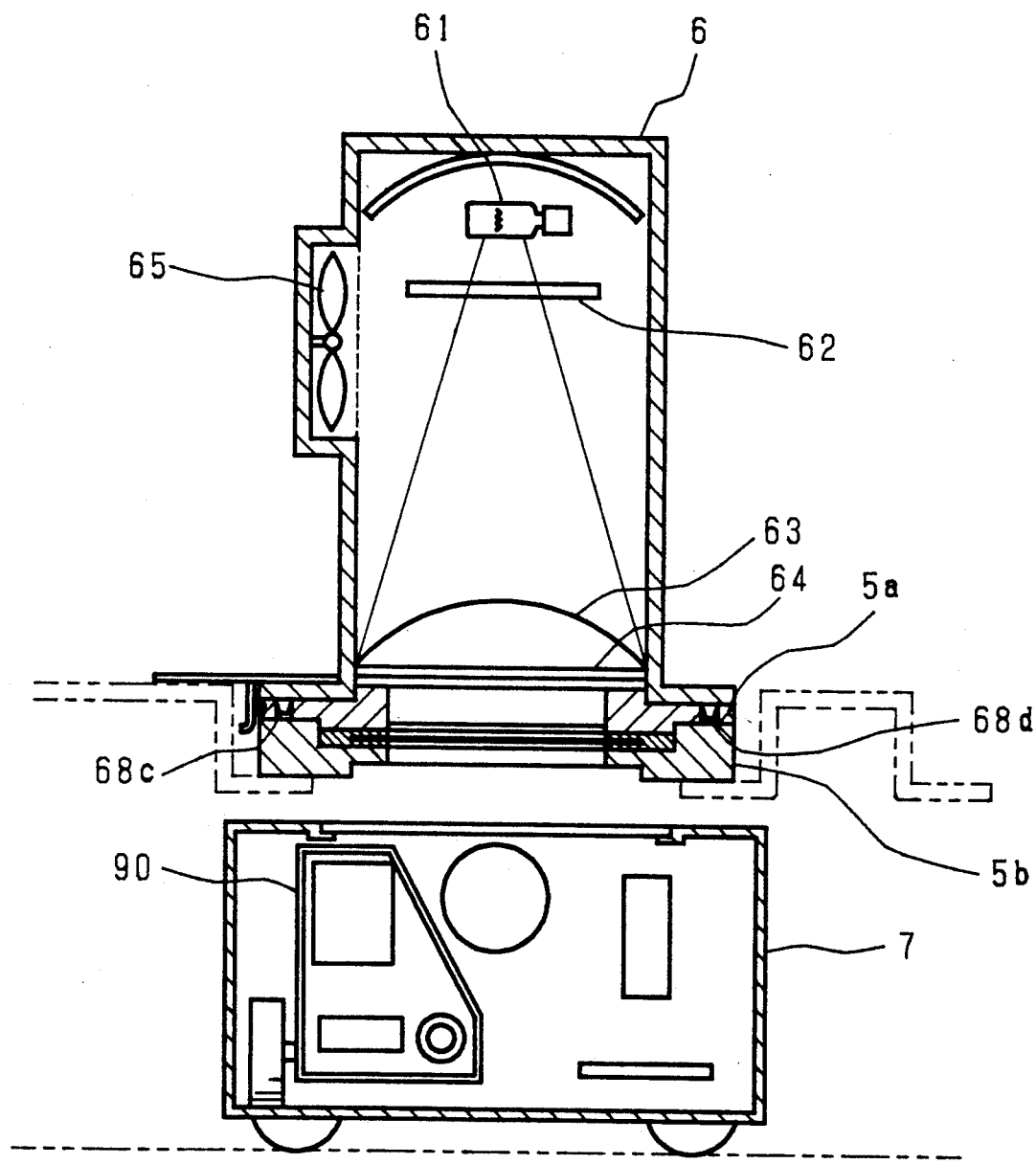
FIG. 16 is a longitudinally sectional view of the principal portion in mounting condition of the light box and film holder onto a main body of the reading apparatus of the invention.

FIG. 15 is a perspective exterior view of the light box 6 used for reading in the mode 4, which is mounted on the film holder 5, and FIG. 16 is a longitudinally sectional view taken on the line 16—16 in FIG. 15, showing the internal construction of the light box 6, FIGS. 15 and 16 showing at the state where a slide mount 100 is held to the film holder 5. The light box 6 is of a rectangular parallel-piped shape having the bottom about equal in the size to the slide mount 100. Pedestals 68a and 68b extend from both the widthwise end portions of the light box 6 and projections 68c and 68d provided at the lower surfaces of pedestals 68a and 68b are fitted into the guide slots 52, whereby the light box 6 is movable lengthwise of the film holder 5. At the bottom is formed a recess 69 engageable with the projection 57a (or the projections 51a) when supporting the slide film (or the film piece) and extending throughout the moving direction.

On the pedestal 68a are mounted a positioning plate 66 for selecting the image of the film to be illuminated and an interrupter 67 used to detect the light box 6 in position on the film holder 5. The positioning plate 66 bending like a leaf spring from the upper surface of the pedestal 68a to the lower side of the light box 6. The positioning plate 66 is slidable following movement of light box 6 by engaging a hemispherical projection at the center of positioning plate 66 with the groove 550. The hemispherical projection is fitted into each recess 55 provided on the basis of the disposed position of slide mount 100 lengthwise of the film holder 5, thereby positioning the film images. When the light box 6 together with the film holder 5 is mounted in the opening 4 at the main body 1, the interrupter 67 projecting frontwardly from the upper surface of pedestal 68a interrupts one of the optical paths vertically provided in each sensing unit 42, thereby enabling the position of light box 6 on the film holder 5 to be detected.

As shown in FIG. 16, a light source 61 for film illumination and a heat insulating filter 62 thereunder are disposed at the upper space in the light box 6, a cooling fan 65 is mounted to one side wall of light box 6, and a collimator lens 63 and a transparent diffuse plate 64 are disposed in layers at the bottom, the transparent diffuse plate 64 being opposite at the lower surface to the film at the film holder 5.

The collimator lens 63 is provided so that the illuminating light of the light source 61 diffused from below the light box 6 is irradiated as the parallel light to the film. Accordingly, the luminous intensity at the peripheral portion of film is prevented from lowering and substantially uniform quantity of light at the high resolution reading part is obtained without insufficient quantity of light at the peripheral portion.

Figure 17:
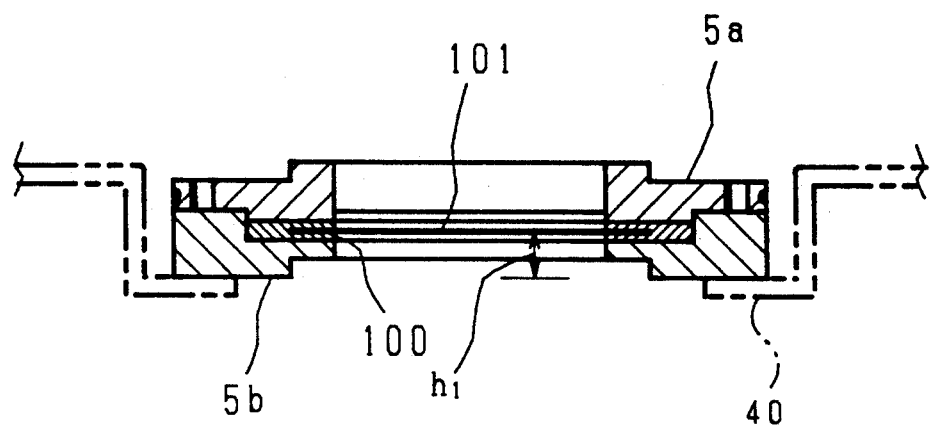
FIGS. 17 through 19 are enlarged sectional views of a film in condition of being held by the film holder at the same.
Figure 18:
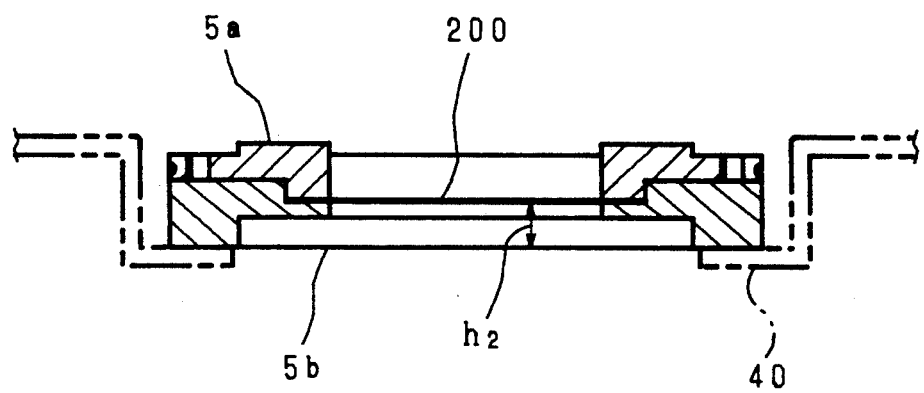

FIG. 17 is an enlarged sectional view of the slide mount 100 held to the film holder 5 and FIG. 18 is that of a film piece 200 held to the same. The pressure plate 5a and base plate 5b are constructed so that a vertical interval $h_1$ between the film surface of slide film 101 and the upper surface of the washer 40 when the slide mount 100 is held therebetween, is equalized to a vertical interval $h_2$ between the film surface and the upper surface of the washer 40 when the film piece is held therebetween. In brief, the intervals between the respective film surfaces and the high resolution reading part 9 of reading head 7 are equal to each other. Accordingly, the apparatus of the invention does not deteriorate the resolution even when refocusing is not carried out for changing the slide mount to the film piece (and vice versa).

Figure 19:
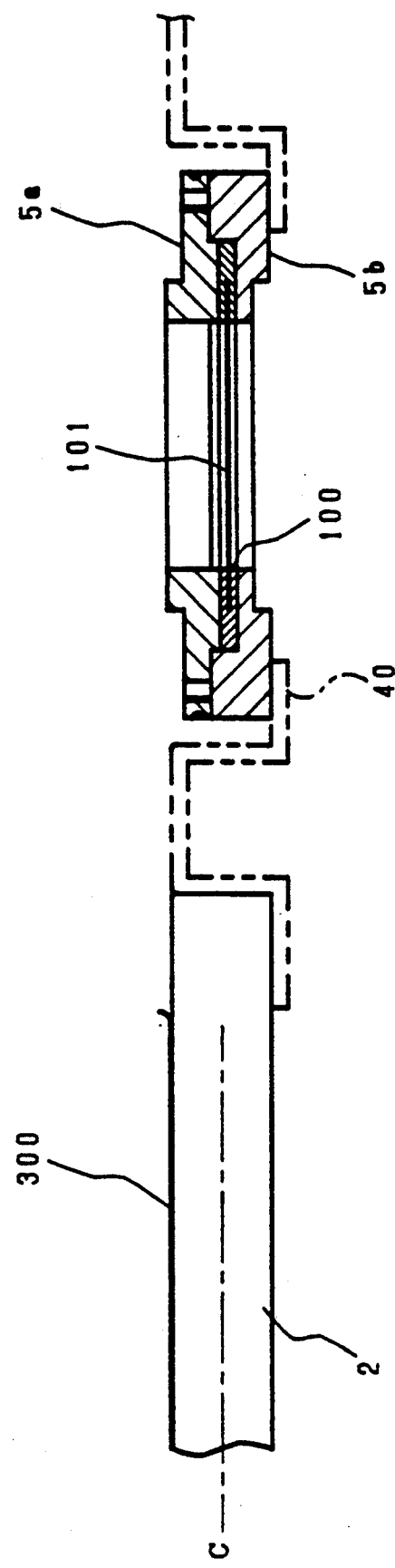

Also, in the apparatus of the invention, as shown in FIG. 19, the film holder 5 is constructed and the washer 40 is set in depth such that the slide film 101 housed in the slide mount 100 is coincident in height with the center line C of thickness of the document table 2. Namely the distance between the slide film 101 and the reading head 7 is coincident with that between the center line C and the reading head 7 to thereby maintain in-focus condition for both of documents on the document table 2 and film housed in the slide mount 100. The surface of the light-impermeable document 300 placed on the document table 2 is positioned substantially in the height of the center line C through the glass. Accordingly, the height of film surface of slide film 101 not through the glass is made coincident with the line C, so that the high resolution reading part can apply a focal distance set as to the light-impermeable document 300 directly to the slide film 101 also, thereby causing no loss of focus. In addition, even when the film piece is held to the film holder 5, the height of film surface coincides with the position of the center line C.

Figure 20:
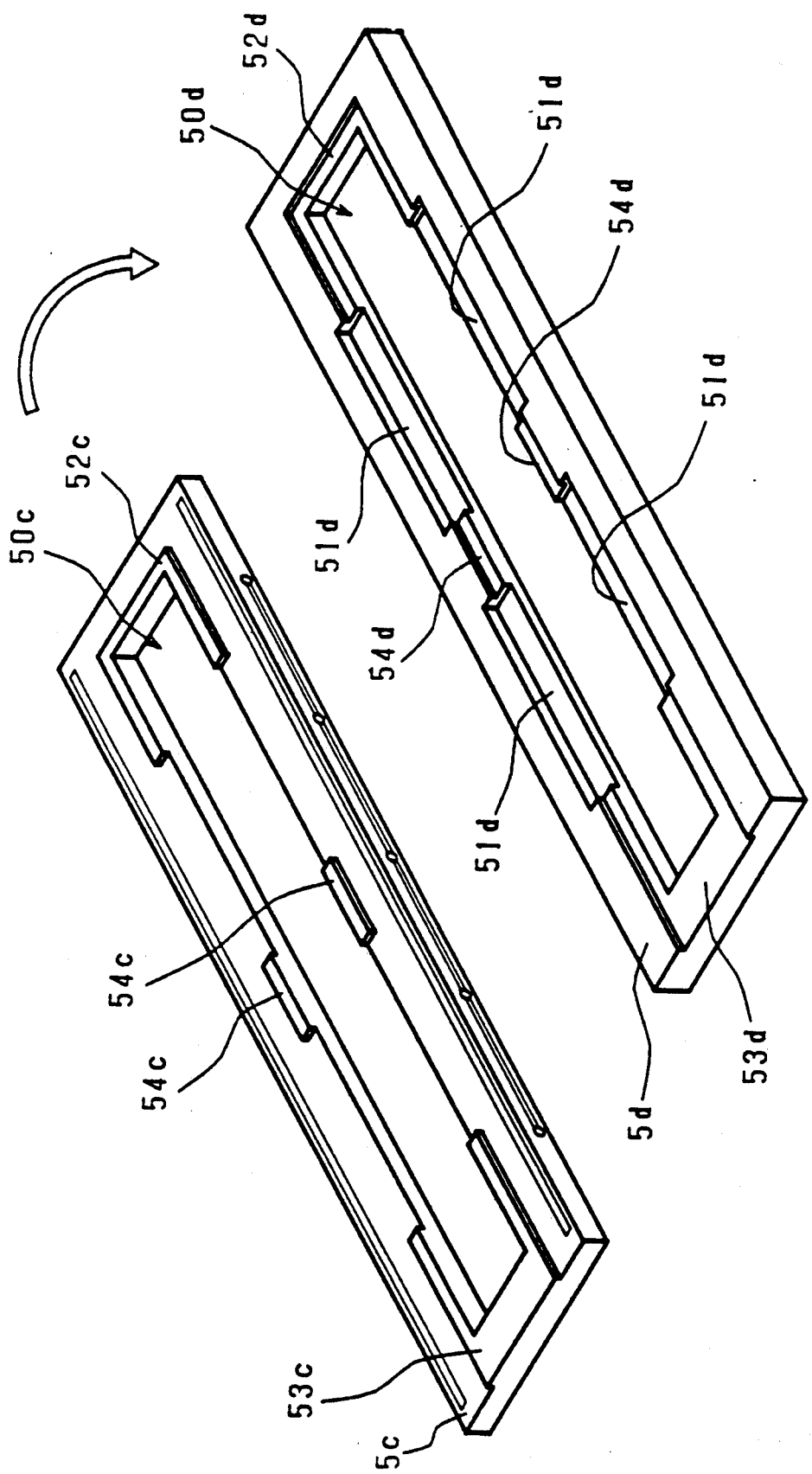
FIG. 20 is a perspective exterior view of another example of the film holder at the same.

FIG. 20 is an perspective exterior view of another example of the film holder, in which a pressure plate 5c and a base plate 5d have at the centers openings 50c and 50d for similarly facing the film image to the exterior. Recesses 52d, 53d and 54d on which the film piece is to be placed are formed at both lengthwise ends and intermediate portions of the surrounding portion of the opening 50d at the upper surface of the base plate 5d. Recesses 51d to which the slide mount is to be fitted are formed at the surrounding portion of opening 50d and between the recesses 52d, 53d and 54d and are lower at one step than them. In brief, the base plate 5d is constructed so that the film piece and slide mount can be fitted thereto by use of the same surface. In this example, as above-mentioned, in order to equalize the intervals between the respective film surface and the reading part, the respective recesses have a difference between depths thereof so as to coincide the height of the respective film surface with each other.

Projections 52c, 53c and 54c to be fitted to the recesses 52d, 53d and 54d are formed at the lower surface (at the upper surface in the drawing) of the pressure plate 5c and at the surrounding portion of the opening 50c corresponding to the recesses 52d, 53d and 54d. Also, grooves like the guide grooves 52 and the grooves 550 at the pressure plate 5a in the aforesaid embodiment are provided at the pressure plate 5c.

In the film holder constructed as the above-mentioned, the slide mount or the film piece is fitted into the corresponding recesses at the base plate 5d and the respective projections at the pressure plate 5c are fitted into the recesses 52d, 53d and 54d, thereby coupling the pressure plate 5c with the base plate 5d. In addition, the film holder in this example does not use both the surfaces of the base plate 5d, whereby the base plate 5d may be fixed to the opening 4.

Figure 21:
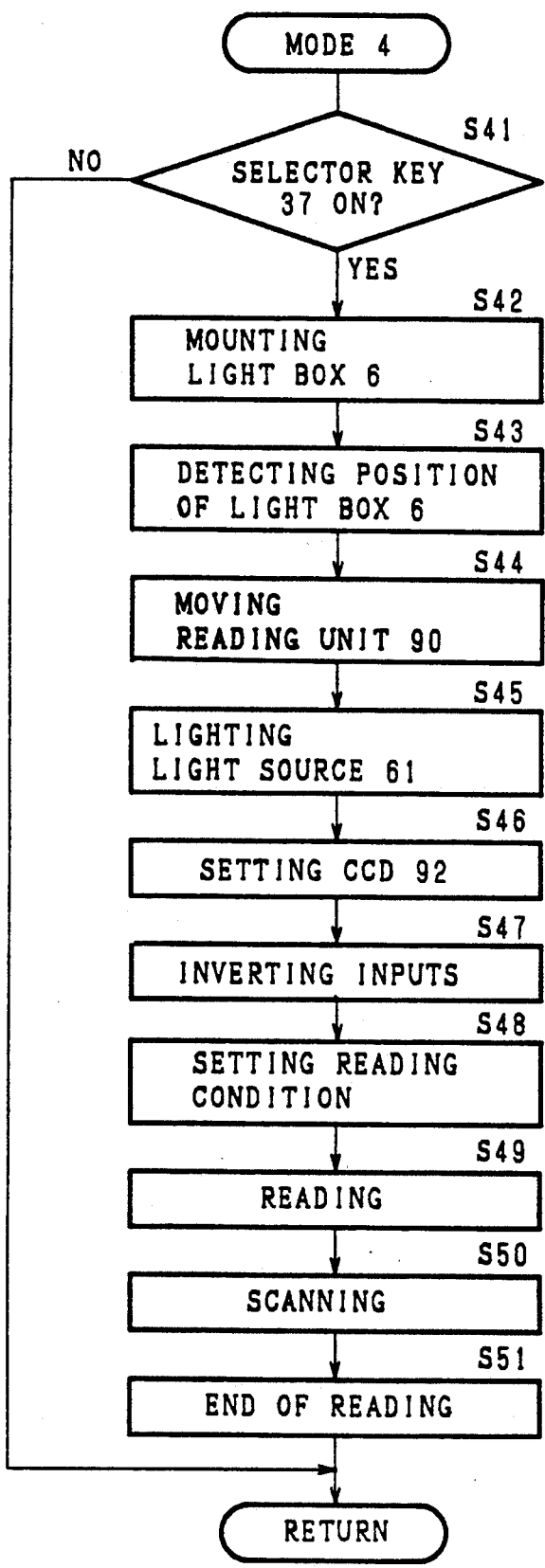

Next, the mode 4 using the film holder 5 and light box 6 constructed as above-mentioned, in other words, the operation of reading the image of photographic film, will be described in accordance with FIG. 21 showing a subroutine of step S4. When the selector key 37 is on (step S41: YES), the mode 4 is selected. At first, an operator holds the slide mount (or film piece) by the film holder 5 as above-mentioned and the light box 6 is mounted thereof (step S42). Next, the pins 58 (or pins 59) at the lower surface of the base plate 5b are fitted into the bores 41 at the washer 40 in the opening 4, whereby the film holder 5 carrying the light box 6 is mounted in the opening 4. In addition, the film holder 5 holding the slide mount (or film piece) may previously be mounted in the opening 4 and then the light box 6 may be mounted to the film holder 5. The light box 6 is moved lengthwise of the film holder 5 so as to position the light box 6 on the desired image. Herein, the light source 70 at the reading head 7 is lit, thereby enabling the image to be clearly checked.

The position of light box 6, that is, the position of image to be read, is detected by the sensing units 42 (step S43). The high resolution reading part 9 at the high resolution reading unit 90, as shown in FIG. 16, is moved in the main scanning direction and set to the initial position of reading the image (step S44), after completion of which, the light source 70 at the reading head 7, when lit, is put out, and then the light source 61 at the light box 6 is lit (step S45). Next, CCD 92 is switched (step S46), the inputs of negative and positive films are inverted (step S47) and the photographic film is read (steps S48, 49, 50 and 51).

In addition, the aforesaid embodiment is constructed so that the film holder 5 coincides at its lengthwise direction with the main scanning direction of the reading apparatus whereby the opening 4 is provided at the left side portion of main body 1 to mount therein the film holder 5. Alternatively, the lengthwise direction of film holder 5 may coincide with the sub-scanning direction of the reading apparatus so as to provide the opening 4 at the front side portion of main body 1, thereby mounting to the opening 4 the film holder 5.

Figure 22:
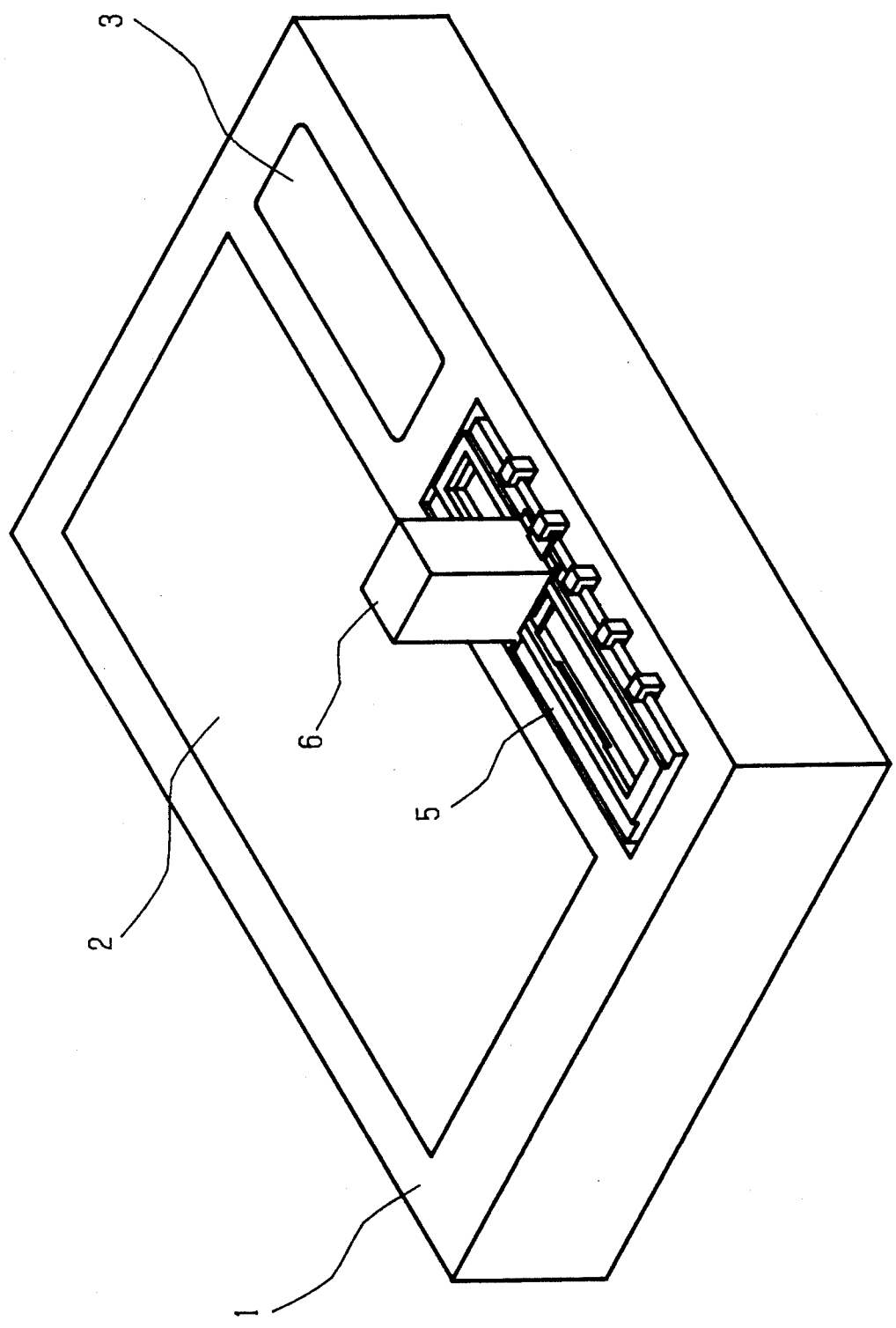
FIGS. 22 and 23 are perspective exterior views of a modified embodiment of the reading apparatus of the invention.
Figure 23:
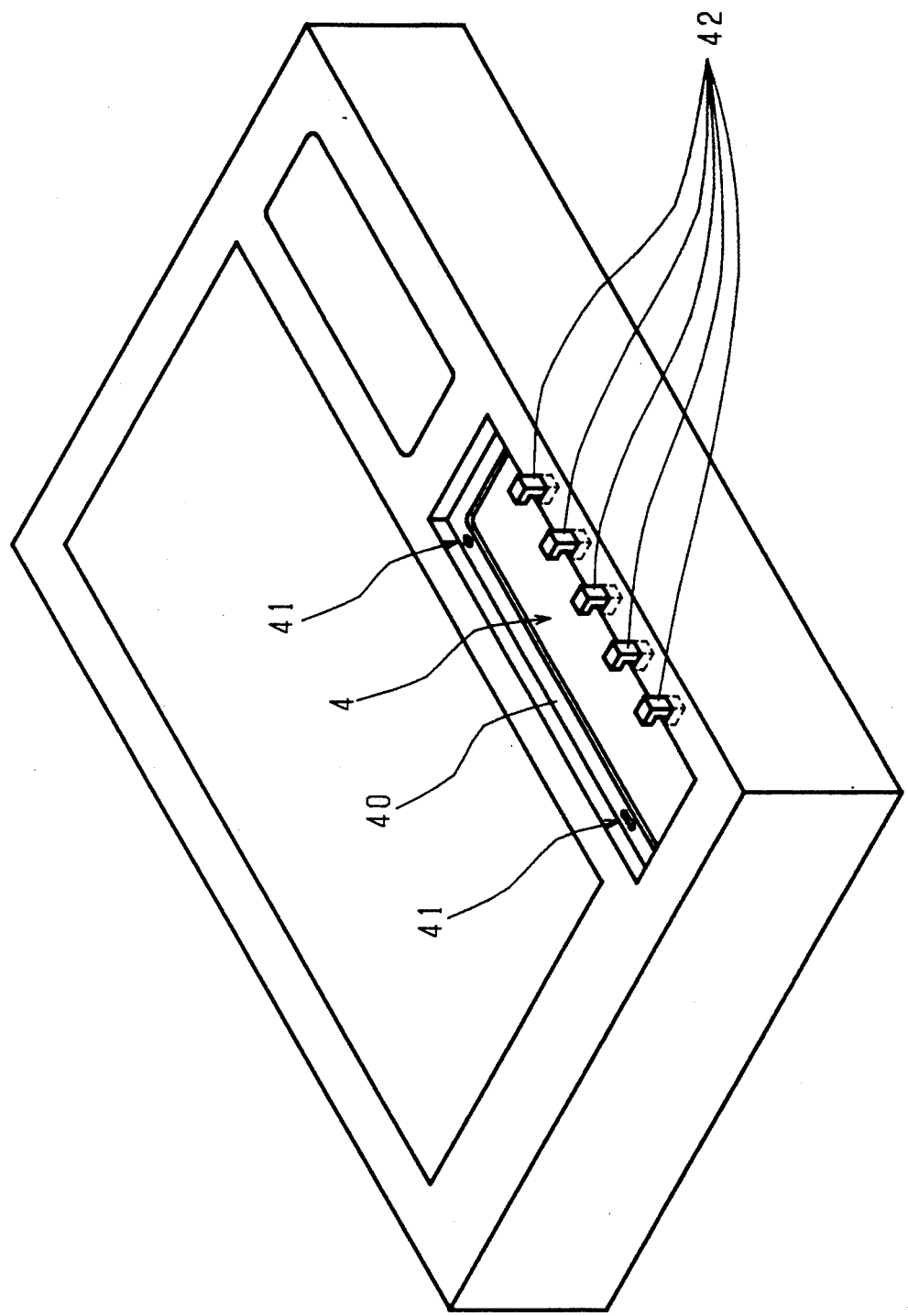

FIGS. 22 and 23 are perspective exterior views showing such a modified embodiment, in which the components designated by like reference numerals in the aforesaid embodiment show like components thereof. In this embodiment, a operation panel 3 and an opening 4 are disposed at the front side end of the main body 1, the opening 4 being coincident lengthwise with the widthwise direction of document table 2, that is, the widthwise direction of the main body 1. Accordingly, the film image is juxtaposed in the direction coincident with the sub-scanning direction of the document table 2. In addition, the internal construction of main body 1, that of light box 6, and configuration of film holder 5 are the same as those in the aforesaid embodiment and the reading operation is so, thereby omitting explanation thereof.

In this embodiment, a fluorescent lamp of an aperture type is used for the light source when a light-impermeable document is read. Alternatively, a reflector shade of a halogen lamp may be made turnable. Also, when the illuminance of the light source is insufficient for reading the light-impermeable document in high resolution, an auxiliary light source may be used. Furthermore, in this embodiment, the focusing rod lens is used for the high resolution reading part, but when quantity of light is sufficient, a zoom lens may be used to constitute a zoom optical system.

Also, the sensing units are used to detect the light box in position on the film holder, which are not defined, but a microswitch or the like may be used. In addition, in this embodiment, the number of slide mounts held to the film holder is two, which may of course be three or more.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A reading apparatus for reading a document, comprising:
   supporting means for supporting said document;
   irradiating means for irradiating light to said document;
   first reading means for receiving the light from said document;
   second reading means, having higher reading resolution than said first reading means, for receiving the light from said document;
   a holding member, moveable relative to a surface of said document, for holding said first and second reading means;
   driving means for driving said holding member in a moving direction;
   said second reading means being moveable in a direction that is different from said moving direction;
   selecting means for selecting one of a first reading mode to read said document by said first reading means and a second reading mode to read said document by said second reading means, wherein selection of the second reading mode can be made independent of selection of the first reading mode; and
   controlling means for controlling said first reading means and second reading means corresponding to an output from said selecting means.

2. A reading apparatus according to claim 1, wherein said first reading mode further comprises a reading mode to read a light-impermeable document in low resolution and a reading mode to read a light-permeable document in low resolution; and wherein said second reading mode further comprises a reading mode to read a light-impermeable document in high resolution and a reading mode to read a light-permeable document in high resolution.

3. A reading apparatus according to claim 1, wherein the reading resolution of said first reading means is 10 to 20 picture elements/mm and that of said second reading means is 50 to 200 picture elements/mm.

4. A reading apparatus according to claim 1, wherein said irradiating means further comprises a light moveable source provided behind said second reading means with respect to said supporting means, said second reading means being positioned corresponding to the position of said light source.

5. The apparatus of claim 1, further including means for moving said second reading means in said different direction.

6. A reading apparatus according to claim 1, wherein said first reading means and second reading means further comprise charge-coupled device (CCD) elements which are driven by a common driving circuit.

7. A reading apparatus according to claim 6, further comprising means for image-processing an output from said charge-coupled device elements of said first reading means and an output from said charge-coupled device elements of said second reading means corresponding to the mode selected said selecting means.

8. The apparatus of claim 1, wherein said second reading means is smaller than said first reading means.

9. The apparatus of claim 8, further including means for moving said second reading means in said different direction.

10. A reading apparatus according to claim 1, wherein said supporting means further comprising a first document table on which said document of a film is supported and a second document table on which said document other than a film is supported.

11. A reading apparatus according to claim 10, wherein said first document table supports a film and a slide mount for housing said film.

12. A reading apparatus according to claim 11, wherein a distance between said slide mount and said second reading means is approximately equal to that between said film and said second reading means.

13. A reading apparatus according to claim 10, wherein said second document table is positioned so that an optical distance between said second reading means and the document placed on said second document table is equal to an optical distance between said second reading means and the document placed on said first document table.

14. A reading apparatus according to claim 10, wherein said irradiating means further comprises a first light source for irradiating the light to the document supported on said first document table and a second light source for irradiating the light to the document supported on said second document table, said first light source being detachably provided behind said second reading means with respect to said first document table.

15. A reading apparatus according to claim 14, wherein said second light source further comprises a light source detachably provided behind said second reading means with respect to said second document table.

16. A reading apparatus according to claim 10, wherein said irradiating means further comprises a light source provided behind said second reading means with respect to said first document table and an optical element which collimates the light irradiated from said light source whereby it is perpendicularly incident on the document.

17. A reading apparatus according to claim 10, wherein said first document table comprises two flat plates, said film being supported between said two plates.

18. A reading apparatus according to claim 17, wherein said second document table is formed of a glass plate, the longest side of said first document table being coincident with one side direction of said second document table.

19. A reading apparatus for reading a document comprising:
   a first platen on which said document is placed;
   first reading means for reading an image of said document, said first reading means having a length corresponding to a width of said first platen;
   second reading means for reading the image of said document, said second reading means having a length smaller than the width of said first platen and having a higher reading resolution than said first reading means;
   selecting means for selecting the second reading means independent of selection of the first reading means;
   first driving means for moving said first reading means and said second reading means in a scanning direction to scan said document; and
   second driving means for moving said second reading means in a direction perpendicular to said scanning direction.

20. A reading apparatus according to claim 19 further comprising:

a second platen provided along said first platen for supporting a film-document.

21. A reading apparatus according to claim 20, wherein said second platen includes a holder detachably provided on said second platen for holding said film-document, said holder supporting a film piece and a slide mount for housing the film piece therein.

22. A reading apparatus for reading a document comprising:

a platen on which said document is placed;

first reading means for reading an image of said document;

second reading means for reading the image of said document, said second reading means having a higher reading resolution than said first reading means and being readable of a same number of picture elements as the first reading means;

selecting means for selecting the second reading means independent of selection of the first reading means; and driving means for scanning the image of the document to be read by said first reading means and said second reading means;

said second reading means is smaller than said first reading means and is moveable in two non parallel directions.

23. A reading apparatus according to claim 22, wherein said first reading means and second reading means have charge-coupled device (CCD) elements respectively, each of said charge-coupled device elements being driven by a common driving circuit.

24. A reading apparatus for reading a document, comprising:

supporting means for supporting said document;

irradiating means for irradiating light to said document;

first reading means for receiving the light from said document;

second reading means, having higher reading resolution than said first reading means, for receiving the light from said document;

a holding member, moveable relative to a surface of said document, for holding said first and second reading means;

driving means for driving said holding member;

selecting means for selecting a first reading mode to read said document by said first reading means or a second reading mode to read said document by said second reading means;

controlling means for controlling said first reading means or second reading means corresponding to an output from said selecting means;

wherein said irradiating means further comprises:

a light source between said first reading means and said second reading means; and switching means for switching said light source between a first state wherein the reflected light from the document travels mainly to said first reading means and a second state wherein the reflected light from the document travels mainly to said second reading means.

* * * * *